(12) United States Patent
Kojima et al.

(10) Patent No.: US 7,289,172 B2
(45) Date of Patent: *Oct. 30, 2007

(54) ELECTRO-OPTICAL DEVICE ENCASED IN MOUNTING CASE AND PROJECTION DISPLAY APPARATUS

(75) Inventors: Hiroyuki Kojima, Suwa (JP); Hiromi Saitoh, Chino (JP); Tomoaki Miyashita, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 88 days.

This patent is subject to a terminal disclaimer.

(21) Appl. No.: 10/725,424

(22) Filed: Dec. 3, 2003

(65) Prior Publication Data

US 2004/0160548 A1    Aug. 19, 2004

(30) Foreign Application Priority Data

Dec. 20, 2002    (JP)    .............................. 2002-370070

(51) Int. Cl.
G02F 1/1333    (2006.01)
(52) U.S. Cl. .......................................... 349/58; 349/60
(58) Field of Classification Search ............. 349/58–60
See application file for complete search history.

(56) References Cited

U.S. PATENT DOCUMENTS

| | | | | |
|---|---|---|---|---|
| 4,762,983 A | * | 8/1988 | Oogita et al. ................ 235/1 D |
| 5,835,139 A | * | 11/1998 | Yun et al. ....................... 349/58 |
| 5,835,179 A | * | 11/1998 | Yamanaka .................... 349/161 |
| 6,950,308 B2 | * | 9/2005 | Saitoh et al. ................ 361/704 |
| 2003/0223020 A1 | * | 12/2003 | Lee .............................. 349/58 |

FOREIGN PATENT DOCUMENTS

| | | |
|---|---|---|
| JP | A-05-324562 | 12/1993 |
| JP | A-10-123964 | 5/1998 |
| JP | A-10-133590 | 5/1998 |
| JP | 10-171368 | * 6/1998 |
| JP | A-10-232629 | 9/1998 |
| JP | A-10-254366 | 9/1998 |
| JP | A-2001-318361 | 11/2001 |
| JP | A 2002-107698 | 4/2002 |
| JP | A-2002-244214 | 8/2002 |
| JP | A 2004-045680 | 2/2004 |
| WO | A1 WO 98/36313 | 8/1998 |

* cited by examiner

*Primary Examiner*—Dung T. Nguyen
(74) *Attorney, Agent, or Firm*—Oliff & Berridge, PLC

(57) ABSTRACT

An electro-optical device encased in a mounting case having an image display region, on which projection light from a light source is incident, includes a mounting case including a plate disposed to face one surface of the electro-optical device and a cover to cover the electro-optical device, a portion of the cover abutting against the plate, the mounting case accommodating the electro-optical device by holding at least a portion of the peripheral region located at the circumference of the image display region of the electro-optical device with at least one of the plate and the cover. Then, at least one of the plate and the cover being bonded to the electro-optical device.

7 Claims, 13 Drawing Sheets

WHEN THE THICKNESS OF DOUBLE COATED
ADHESIVE TAPE IS LESS THAN 50 μm

WHEN THE THICKNESS OF DOUBLE COATED
ADHESIVE TAPE IS MORE THAN 200 μm

ELECTRO-OPTICAL DEVICE ENCASED IN MOUNTING CASE AND PROJECTION DISPLAY APPARATUS

BACKGROUND OF THE INVENTION

1. Field of Invention

The present invention relates to an electro-optical device encased in a mounting case in which an electro-optical device, such as a liquid crystal panel, which is used as a light valve of a projection display apparatus, such as a liquid crystal projector, is accommodated or encased in a mounting case and to a projection display apparatus including the electro-optical device encased in the mounting case.

2. Description of Related Art

In the related art, generally, when a liquid crystal panel is used as a light valve of a liquid crystal projector, the liquid crystal panel is not provided in an exposed state on a console, etc., constituting the liquid crystal projector, but it is accommodated or encased in a suitable mounting case, and then the mounting case including the liquid crystal panel is provided on the console. Herein, the liquid crystal panel can be easily attached and fixed to the console by suitable screw holes provided in the mounting case.

In the liquid crystal projector, the light emitted from a light source is projected on the liquid crystal panel encased in the mounting case as focused light. Light passing through the liquid crystal panel is enlarged and projected on the screen to display images. In such a liquid crystal projector, since the enlarged projection is generally predetermined, relatively intensive light emitted from a light source, such as a metal halide lamp is used.

According to this constitution, first, there is a problem in which the temperature of the liquid crystal panel in the mounting case rises. The rise in temperature causes the rise in temperature of the liquid crystal interposed between a pair of transparent substrates in the liquid crystal panel. Therefore, the characteristics of the liquid crystal are deteriorated. In addition, when the light emitted from the source light is uneven, the liquid crystal panel is partially heated, and then the deviation of its transmittance is generated by the so-called hot spots. Thus, the quality of projected images deteriorates.

Techniques for preventing the rise in temperature of the liquid crystal panel include an approach for preventing the rise in temperature of the liquid crystal panel by providing a heat radiating sheet between the liquid crystal panel and a heat radiating plate in a liquid crystal display module including the liquid crystal panel and a package for holding and accommodating the liquid crystal panel and for having the heat radiating plate.

In addition, in order to address the problem, other approaches, such as an approach of providing a light shielding film on a substrate located at the side of the liquid crystal panel on which light is incident and an approach of using the mounting case made of a light reflective material, in which the liquid crystal panel is held or accommodated, have been known.

However, the related art approaches for preventing the rise in temperature of the liquid crystal panel have the following problems. As long as intensive light is emitted from the light source, the problem of the rise in temperature of the liquid crystal panel may occur at any time. Therefore, in order to obtain still higher image quality, more effective measures to prevent the rise in temperature are required instead of or in addition to the aforementioned approaches.

Further, there is the following difficulty for each approach for preventing the rise in temperature as described above.

According to the approach of using the above-described heat radiating sheet, while it may be thought that heat accumulation in a liquid crystal panel can effectively radiate outward, there is no effective action to decide a position of the liquid crystal panel in a package. Specifically, using the heat radiating sheet, while the rise in temperature of the liquid crystal panel will definitely cause the rise in temperature of the package, it may be thought that the dislocation of liquid crystal panel in the package occurs due to the difference in coefficients of linear expansion between the heat radiating sheet and the package.

Moreover, when it is assumed that the heat radiating plate or the heat radiating sheet is provided to cover the whole surface of a substrate, they may be useless for a transmissive liquid crystal panel although being useful for a reflective liquid crystal panel.

In addition, according to the approach of reflecting light by the light shielding film and the mounting case, as the areas of the light shielding film and the mounting case increase, the amount of the reflected light increases. Thus, the rise in temperature of the liquid crystal panel can be reduced or prevented. However, if the amount of the reflected light increases indiscriminately, the stray light increases in the housing for accommodating the liquid crystal panel in the mounting case. Thus, the quality of images can be deteriorated. In addition, since the increase of the area of the light shielding film causes the reduction of the amount of the light from the source light, which is to be originally incident to and to pass through the liquid crystal panel, the image can be dark. Thus, it is contrary to the aforementioned purpose in which the intensive light source is used in order to display brighter image. Accordingly, the aforementioned related art approaches do not have solutions for the above problems.

SUMMARY OF THE INVENTION

In consideration of the problems described above, the present invention provides an electro-optical device encased in a mounting case capable of, reducing or preventing an electro-optical device from deviating from its location, an electro-optical device encased in a mounting case capable of efficiently reducing the rise in temperature of an electro-optical device on which relatively intense projection light is incident, and a projection display apparatus including such a device.

In order to achieve the above, there is provided an electro-optical device in a mounting case; an electro-optical device having an image display region, on which projection light from a light source is incident, a mounting case including a plate disposed to face one surface of the electro-optical device and a cover to cover the electro-optical device, a portion of the cover abutting against the plate, the mounting case accommodating the electro-optical device by holding at least a portion of a peripheral region located in the circumference of the image display region of the electro-optical device with at least one of the plate and the cover. Furthermore, the electro-optical device is bonded to at least one of the plate and the cover.

According to the electro-optical device encased in the mounting case of an aspect of the present invention, the electro-optical device having the image display region, on which the projection light from the light source is incident, is accommodated into the mounting case including the plate and the cover. The electro-optical device includes, for example, a liquid crystal device or a liquid crystal panel which is mounted as a light valve of the projection display apparatus. In addition, the mounting case may have an additional function, such as a light shielding function to prevent the leakage of light in the peripheral region of the electro-optical device and the influx of the stray light from the peripheral region to the image display region by partially covering at least a portion of the peripheral region of the electro-optical device.

Then, the electro-optical device is bonded to at least one of the plate and the cover. As a result, first, because of the adhesive strength of the bond, it is possible to effectively reduce the likelihood of or prevent a situation in which the positional deviation of electro-optical device in the mounting case occurs. In particular, when the electro-optical device encased in the mounting case is constructed into a projection display apparatus, such as a liquid crystal projector, etc., it is considered that relatively great tension acts on a flexible connector extending from the electro-optical device. However, in an aspect of the present invention, since the bond exists, there can be obtained an advantage that the positional deviation of the electro-optical device encased in the mounting case does not simply occur although the relatively great tension acts on the flexible connector.

Further, if such bonding has reasonable thermal conductivity, it is possible to favorably implement heat transfer from the electro-optical device to the plate. Thus, when the temperature of the electro-optical device rises due to light incident on the elector-optical device from a light source, it is possible to efficiently transfer the heat to the plate via the bond.

As described above, in accordance with an aspect of the present invention, it is possible to obtain two effects, i.e., the fixation (adhesion) of the electro-optical device to the mounting case and the efficient cooling of the electro-optical device.

In an aspect of the electro-optical device encased in a mounting case according to the present invention, the bond includes at least one of a double coated adhesive tape and a mold material.

In accordance with such aspect, the bond includes at least one of the double coated adhesive tape and the mold material. Herein, the double coated adhesive tape means a tape in which each of the front and back surfaces has adhesive power, and the mold material means an adhesive made of, e.g., silicon resin. In this regard, it is possible to easily bond the plate to the electro-optical device.

Further, in the present aspect, it is possible to variously set the specific shape of "the double coated adhesive tape" or the shape of a region to which the mold material is applied, i.e., the shape of a region where the adhesion acts between the plate and the electro-optical device. For instance, as will be described below, the double coated adhesive tape or the mold material is provided to correspond the whole peripheral region, so that the electro-optical device can be bonded to the plate in the whole peripheral region.

Moreover, the double coated adhesive tape or the mold material is provided along each of two sides, which are opposite to each other, of a substrate constituting an electro-optical device, i.e., in a stripe shape, so that the electro-optical device can be bonded to the plate. In addition, when the electro-optical device is a liquid crystal display device, "the substrate constituting an electro-optical device" includes, for example, a pair of substrates arranged to face each other with a liquid crystal layer, more particularly, a TFT array substrate, in which thin film transistors as switching elements are formed in a matrix, and a counter substrate, or a dustproof substrate, which is provided on the side not facing the liquid crystal layer of any one or both of such pair of substrates. Further, it should be typically considered that the direct bonding of the double coated adhesive tape or the mold material is executed on such pair of substrates or such dustproof substrate, etc. That is, typically "the adhesion between an electro-optical device and a plate" corresponds to "the adhesion between a substrate constituting an electro-optical device and a plate".

As described above, in accordance with a case where the double coated adhesive tape is provided at only the peripheral region, it is possible to properly bond the electro-optical device to the plate although the electro-optical device according to an aspect of the present invention is what is called "a transmissive type".

However, in an aspect of the present invention, it could not be positively excluded that a specific shape of the double coated adhesive tape is almost equal to the area of the substrate. Thus, such a case can also be available if only the electro-optical device according to an aspect of the present invention is a reflective type.

In an aspect of an electro-optical device encased in a mounting case according to the present invention, at least one of the double coated adhesive tape and the mold material is made of a material having a heat conductivity of 0.6 W/m·K or more.

In accordance with such an aspect, because at least one of the double coated adhesive tape and the mold material is made of a material having a heat conductivity of 0.6 W/m·K or more, the heat transferred from the electro-optical device to the double coated adhesive tape or the mold material is rapidly transferred to the plate again. Thus, in accordance with such an aspect, it is possible to more effectively cool the electro-optical device.

Further, "double coated adhesive tapes" satisfying such requirements includes, for example, a double coated adhesive tape which contains heat conductive silicon rubber, a double coated adhesive tape which contains the heat conductive silicon rubber and has a multi-layered structure in which the materials of a bonding layer and a layer to be bonded are changed, and the like. In addition, for example, silicon RTV rubber is used as a "mold material."

In another aspect of the electro-optical device encased in the mounting case according to the present invention, a double coated adhesive tape includes acryl rubber.

In accordance with such an aspect, the double coated adhesive tape according to the present invention includes not the silicon rubber as described above but the acryl rubber as a main body, and has a structure capable of including metal oxide or metal nitride. Such a double coated adhesive tape may be what is called an acryl-based heat conductive double coated adhesive tape and has very excellent heat conductivity. Specifically, it is possible to attain the heat conductivity of 1.0 W/m·K or more.

Accordingly, in accordance with an aspect of the present invention, it is possible to effectively cool the electro-optical device.

In another aspect of the electro-optical device encased in the mounting case according to the present invention, at least one of the double coated adhesive tape and the mold material is provided to correspond to the whole peripheral region, and at least one of the plate and the cover is bonded to the electro-optical device over the whole peripheral region.

In accordance with such an aspect, it is possible to securely and tightly bond the plate to the electro-optical device. Further, as the contact area with the double coated adhesive tape or the mold material is increased, heat is efficiently transferred from the electro-optical device to the plate. Thus, it is possible to efficiently cool the electro-optical device. Furthermore, as described above, because the electro-optical device is bonded to the plate over the whole peripheral region, it is possible to easily enhance adhesion power if the size (wherein screen size [in inches] is considered as the reference) of the electro-optical device is relatively small.

In accordance with another aspect of the electro-optical device encased in the mounting case according to the present invention, the double coated adhesive tape has a thickness of 50 to 200 μm.

According to such an aspect, since the thickness of the double coated adhesive tape is a suitable thickness, it is possible to definitely bond the electro-optical device to the plate described above, and to effectively transfer heat from the former to the latter.

Namely, when the thickness of the double coated adhesive tape is less than 50 μm, because of unevenness on the surface of the plate, i.e., unevenness due to an inherent rugged surface of an original material constituting the plate, a portion of the double coated adhesive tape is buried in the concave portions of the unevenness, and thus the whole surface of the double coated adhesive tape is not bonded to a substrate constituting the electro-optical device. As a result, because the gap between the substrate and the plate is generated due to the unevenness, heat transfer efficiency between them also decreases. In accordance with the present aspect, because the thickness of the double coated adhesive tape is not less than 50 μm, such a problem hardly occurs.

On the other hand, when the thickness of the double coated adhesive tape is more than 200 μm, the adhesion between the plate and the double coated adhesive tape and the adhesion between the substrate constituting the electro-optical device and the double coated adhesive tape are effectively accomplished respectively. However, the relative positional disparity between the two occurs due to the inherent elasticity of the double coated adhesive tape. In addition, the greater the thickness of the double coated adhesive tape increases, the longer a heat transfer path lengthens. As a result, it could be considered that heat transfer efficiency decreases. In accordance with the present aspect, because the thickness of the double coated adhesive tape is not more than 200 μm, such a problem hardly occurs.

As described above, because the thickness of the double coated adhesive tape according to the present aspect is limited to the range of 50 to 200 μm, it is possible to securely bond the plate to the electro-optical device and to efficiently transfer heat from the former to the latter.

In accordance with another aspect of an electro-optical device encased in a mounting case according to the present invention, at least one of the outmost surface of the plate and the outmost surface of the cover is black in color.

In accordance with such an aspect, since the outmost surface of the plate is black in color, it is possible to depress light reflection from the outmost surface as much as possible. Herein, when the outmost surface with black color includes a surface of a light incident part, it is possible to reduce the likelihood or prevent an undesired situation where light is incident on the electro-optical device from a light emitting part of the electro-optical device because the reflection from the surface is reduced or prevented. As a result, when an electro-optical device includes a substrate including a semiconductor device in which characteristics thereof vary depend on what is called light leak current, it is possible to reduce or prevent light incidence on the semiconductor device and to preferably maintain the characteristics.

Further, as described above, it is possible to evade a situation where reflected light is reflected on the electro-optical device, etc. again and thus the light is finally mixed into images.

On the other hand, when the outmost surface includes a light-emitting surface of the plate, it reduces or prevents light from being reflected from the surface. Specifically, it reduces or prevents the light emitted from an electro-optical device encased in a mounting case from being reflected from any element provided on the outside, e.g., a dichroic prism in a case where the electro-optical device encased in the mounting case is mounted in a liquid crystal projector, and then the reflected light is reflected from the light emitting surface. Thus, it is possible to avoid a situation where such reflected light is mixed into images.

As described above, in accordance with the present aspect, generally, because light reflection from the plate is depressed, it is possible to display high-quality images using the electro-optical device encased in the mounting case.

In addition, in order to make the outmost surface of the plate black, for example, it is preferable to perform a plating process or a coating process on the surface of the plate as will be described below. Further, as clear above, the "outmost surface" in the present aspect does not mean the whole outmost surface of the plate. The "outmost surface" denotes at least a portion of the outmost surface of the plate.

In such an aspect, it is preferable that a plating process be performed on at least one of the surface of the plate or the surface of the cover.

According to such a configuration, the surface of the plate is plated with Ni (nickel), Cr (chrome), or Zn (zinc), etc., so that the outmost surface of the plate can have black color. In this way, as compared with the plate of which the outmost surface is black in color through a painting process, the adhesion between the plate and the double coated adhesive tape can be made stronger. In case of painting, paint is easily exfoliated from the plate. Thus, although paint is tightly bonded to the double coated adhesive tape, there is a possibility that the paint may be exfoliated from the plate. However, in the present aspect, there is no such trouble because the outmost surface is black in color through a plating process.

As described above, in accordance with the present aspect, the plate is securely and tightly bonded to the double coated adhesive tape, so that the plate can be securely and tightly bonded to the electro-optical device.

In such a configuration, it is preferable that the above-described plating process be performed after performing a blast process on at least one of a surface of the plate and a surface of the cover.

According to such a configuration, the above-described plating process may be performed on the surface of the plate on which the blast process is performed. Herein, the blast process is a process where particles, such as iron, sand, glass, etc., are stuck to a surface of any material, thereby making the surface rough. The rough surface subjected to such a blast process may be called a "crepe surface." In general, because the blast-processed surface of the plate is uneven in disorder, it is possible to effectively achieve the operation of preventing the light reflection as described above.

In order to achieve the above, a projection display apparatus of an aspect of the present invention includes the aforementioned electro-optical device encased in the mounting case (including their various aspects); the light source; an optical system to guide the light emitted from the light source into the electro-optical device; a projection optical system to project the light emitted from the electro-optical device.

In accordance with such an aspect, the plate is fixed (bonded) to the electro-optical device by a double coated adhesive tape or a mold material. Thus, the plate can be securely bonded to the electro-optical device, and heat can be efficiently transferred from the electro-optical device to the plate. As a result, the dislocation occurrence of an electro-optical device encased in a mounting case can be reduced or prevented, and the electro-optical device can be effectively cooled. Thus, higher-quality images can be displayed.

The operations and other advantages of the present invention will be apparent from the exemplary embodiments described later.

DETAILED DESCRIPTION OF EXEMPLARY EMBODIMENTS

Now, exemplary embodiments of the present invention will be described with reference to the accompanying figures.

An Exemplary Embodiment of a Projection Liquid Crystal Apparatus

First, with reference to FIG. 1, an exemplary embodiment of a projection liquid crystal apparatus according to the present invention will be described on the basis of an optical system into which optical units are assembled. The projection display apparatus of the exemplary embodiment is constructed as a multi-plate color projector composed of three liquid crystal light valves, which is an example of an electro-optical device encased in a mounting case.

Figure 1:
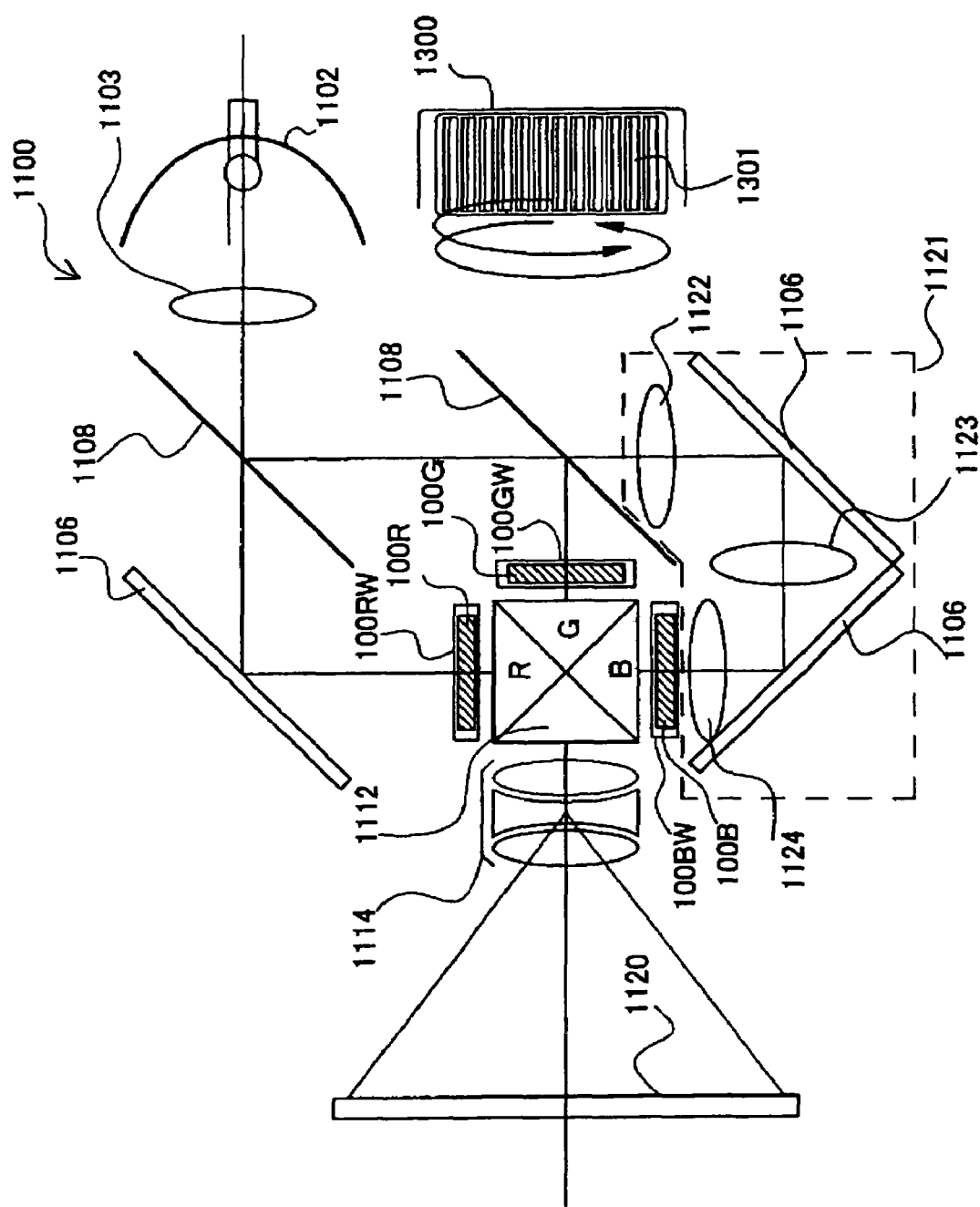
FIG. 1 is a plan view illustrating an exemplary embodiment of a projection liquid crystal apparatus according to the present invention.

In FIG. 1, a liquid crystal projector 1100, an example of the multi-plate color projector, is a projector which utilizes three liquid crystal light valves having electro-optical devices in which driving circuits are mounted on TFT array substrates as RGB light valves 100R, 100G, and 100B.

In the liquid crystal projector 1100, the light emitted from a lamp unit 1102, which is a white light source, such as a metal halide lamp, is divided into R, G, and B light components corresponding to three primary colors R, G, and B, by three mirrors 1106 and two dichroic mirrors 1108, and the light components are guided into the light valves 100R, 100G, and 100B corresponding to the colors. In particular, the B light component is guided through a relay lens system 1121 including an incident lens 1122, a relay lens 1123, and an emitting lens 1124 in order to reduce or prevent the loss of light due to its long optical path. The light components corresponding to the three primary colors, which are modulated by the light valves 100R, 100G, and 100B, are synthesized by a dichroic prism 1112 and then projected on the screen 1120 as a color image through a projection lens 1114.

An active matrix driving liquid crystal apparatus, in which TFTs are used as switching devices, is used as the light valves 100R, 100G, and 100B of the exemplary embodiment. The light valves 100R, 100G, and 100B are composed of the electro-optical devices encased in the mounting cases as described later in detail.

Further, as shown in FIG. 1, a fan 1300 to send cooling air to light valves 100R, 100G, and 100B is provided in such a liquid crystal projector 1100. The fan 1300 includes a substantially cylindrical member having a plurality of blades 1301 in the side thereof, and the blades 1301 generate wind by rotating the cylindrical member with its axis as a center. The wind generated by the fan 1300 in accordance with such a principle flows in whirls as shown in FIG. 1.

The wind is supplied to the respective light valves 100R, 100G, and 100B through an air passage not shown in FIG. 1, and blows from respective outlets 100RW, 100GW, and 100BW provided near the light valves 100R, 100G, and 100B to the light valves 100R, 100G, and 100B.

If the fan 1300 as described above is used, it is possible to obtain an advantage that the wind is easily supplied to narrow spaces around the light valves 100R, 100G, and 100B because the wind has a high static pressure.

In the aforementioned construction, the light emitted from the lamp unit 1102, which is an intensive light source, raises the temperatures of the light valves 100R, 100G, and 100B. An excessive rise in temperature deteriorates the liquid crystal the respective light valves 100R, 100G, and 100B or produces hot spots due to partial heating of the liquid crystal panel caused by unevenness of the light emitted from the light source, resulting in uneven transmissivity. Thus, in the present exemplary embodiment, particularly, each of light valves 100R, 100G, and 100B is bonded to the plate constituting a mounting case and the electro-optical device by a double coated adhesive tape having relatively excellent heat conductivity, as will be described below. Therefore, it is possible to effectively suppress the rise in temperature of the light valves 100R, 100G, and 100B, as described later.

In the exemplary embodiment, it is preferable that a cooling device including a circulating unit to circulate a coolant through the surrounding spaces of the light valves 100R, 100G, and 100B should be provided within a housing of the liquid crystal projector 1100. In this way, it is possible to further effectively cool the electro-optical device encased in the mounting case having a heat radiating function as described later.

An Exemplary Embodiment of an Electro-optical Device

Figure 2:
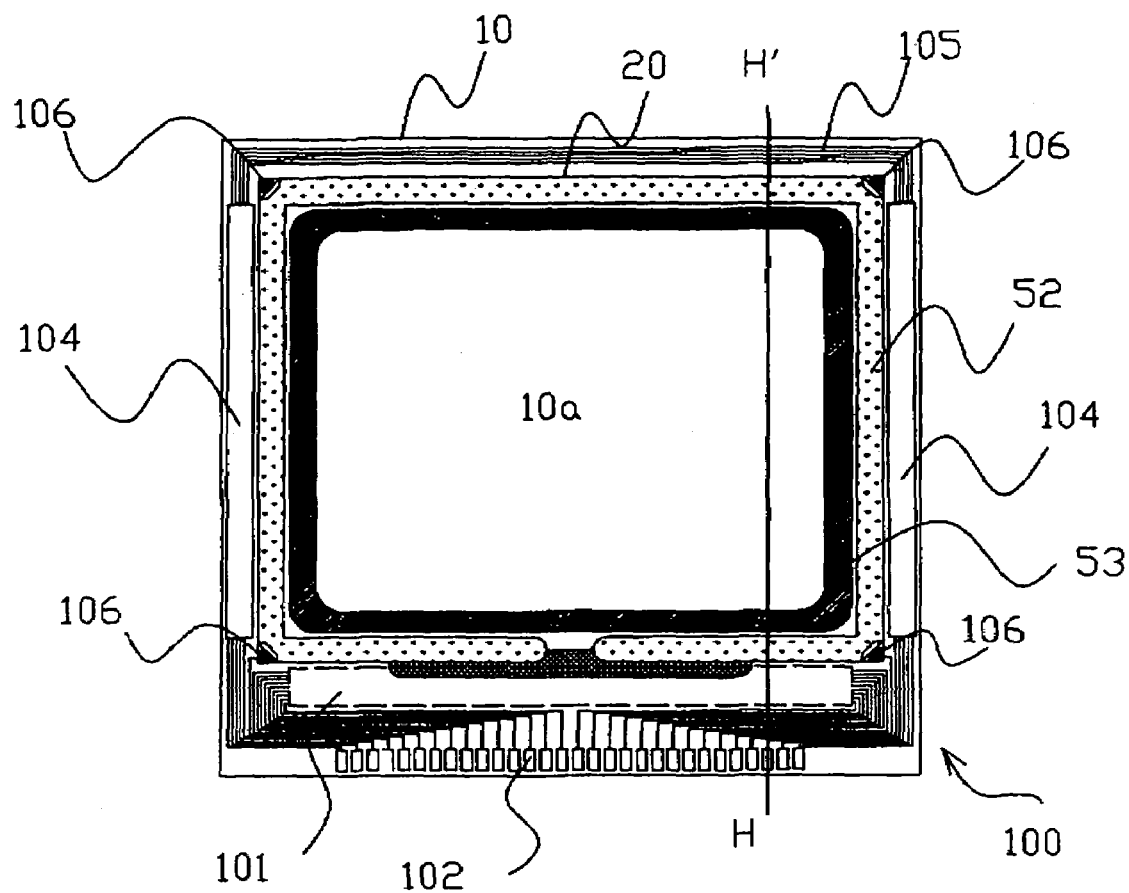
FIG. 2 is a plan view illustrating an exemplary embodiment of an electro-optical device according to the present invention.
Figure 3:
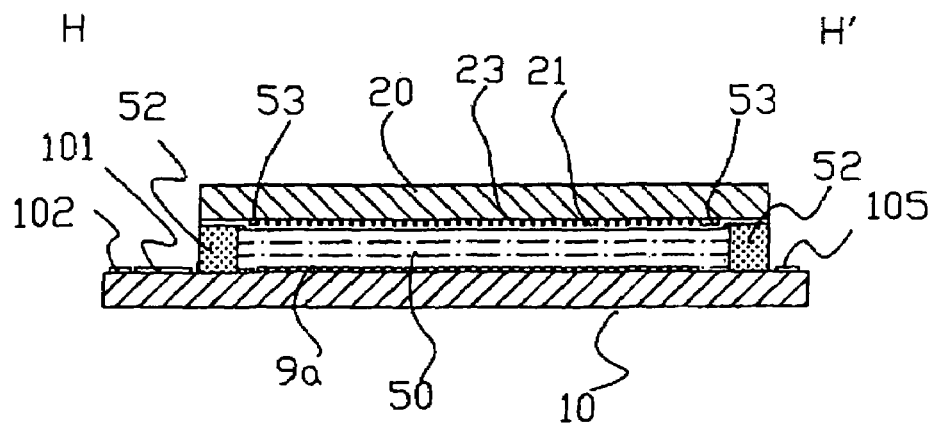
FIG. 3 is a cross-sectional view taken along the plane H-H' shown in FIG. 2.

Next, the overall construction of an electro-optical device according to an exemplary embodiment of the present invention will be described with reference to FIGS. 2 and 3. Herein, a driving circuit built-in TFT active matrix driving liquid crystal device is illustrated as an example of an electro-optical device. The electro-optical device according to the exemplary embodiment is used as liquid crystal light valves 100R, 100G, and 100B of the aforementioned liquid crystal projector 1100. Herein, FIG. 2 is a plan view of the electro-optical device and illustrates a TFT array substrate and constructional components provided thereon as shown from the counter substrate. FIG. 3 is a cross-sectional view taken along the plane H-H' shown in FIG. 2.

Referring to FIGS. 2 and 3, in the electro-optical device according to the exemplary embodiment, the TFT array substrate 10 is disposed to face the counter substrate 20. A liquid crystal layer 50 is interposed and sealed between the TFT array substrate 10 and the counter substrate 20. The TFT array substrate 10 and the counter substrate 20 are bonded to each other by a seal member 52 disposed at a seal region which is located around an image display region 10a.

The seal member 52 for bonding both substrates is made of, for example, ultra-violet curable resin, thermosetting resin, and the like, which are applied on the TFT array substrate 10 and then cured by ultra-violet irradiation or heating in manufacturing processes. In addition, spacers made of a material, such as glass fiber or glass bead, are dispersed in the seal member 52 to keep the gap between the TFT array substrate 10 and the counter substrate 20 (the gap between the substrates) at a predetermined interval. Therefore, the electro-optical device of the exemplary embodiment is used for a light valve of the projector as a small-sized device and is suitable to enlarge and displaying images.

A frame light shielding film 53 to define a frame region of the image display region 10a is provided at the counter substrate 20 parallel to the inner side of the seal region where the seal member 52 is disposed. All or a portion of the frame light shielding film 53 may be provided at the TFT array substrate 10 as a built-in light shielding film.

In the peripheral region located at the outer side of the seal region, where the seal member 52 is disposed, of a region extending to the circumference of the image display region, a data line driving circuit 101 and an external circuit connection terminal 102 are provided along one side of the TFT array substrate 10, and scanning line driving circuits 104 are provided along two sides adjacent to the one side. Furthermore, a plurality of wiring lines 105 to connect the scanning line driving circuits 104 provided along two sides of the image display region 10a is provided at the remaining side of the TFT array substrate 10. As shown in FIG. 2, upper and lower conducting members 106 to serve as upper and lower conduction terminals between the two substrates are disposed at four corners of the counter substrate 20. On the other hand, on the TFT array substrate 10, the upper and lower conduction terminals are provided at the regions opposite to the corners. Through these members, the electrical conduction is made between the TFT array substrate 10 and the counter substrate 20.

In FIG. 3, pixel-switching TFTs and wiring lines, such as scanning lines and data lines are formed on the TFT array substrate 10, and then, alignment layers are formed on a pixel electrode 9a. On the other hand, on the counter substrate 20, a counter electrode 21 and a light shielding film 23 in a lattice or stripe shape are provided, and in addition, an alignment layer is formed on the uppermost portion thereof. A liquid crystal layer 50, which is made of, for example, one kind of nematic liquid crystal or a mixture of plural kinds of nematic liquid crystal, takes a predetermined alignment state between a pair of alignment layers.

In addition to the data line driving circuit 101 and the scanning line driving circuits 104, etc., a sampling circuit to sample image signals on image signal lines and to supply the sampled image signals to data lines, a precharge circuit to supply the precharge signals of a predetermined level to a plurality of data lines prior to the image signals, and an inspection circuit and the like to inspect the quality and defects of the electro-optical device during the manufacturing process or at the time of forwarding may be formed on the TFT array substrate 10 shown in FIGS. 2 and 3.

When the electro-optical device as constructed above is operated, intensive light is radiated from the upper side of FIG. 3. As a result, the temperature of the electro-optical device rises by heating due to the light absorption in the counter substrate 20, the liquid crystal layer 50, and the TFT array substrate 10, etc. The rise in temperature facilitates the deterioration of the liquid crystal layer 50 and causes the deterioration of the quality of the display image.

Therefore, in the present exemplary embodiment, the rise in temperature can be effectively suppressed by an electro-optical device encased in the mounting case of the exemplary embodiment described below.

An Electro-optical Device Encased in a Mounting Case

Next, an electro-optical device encased in the mounting case according to an exemplary embodiment of the present invention will be described with reference to FIGS. 4 to 11.

Figure 4:
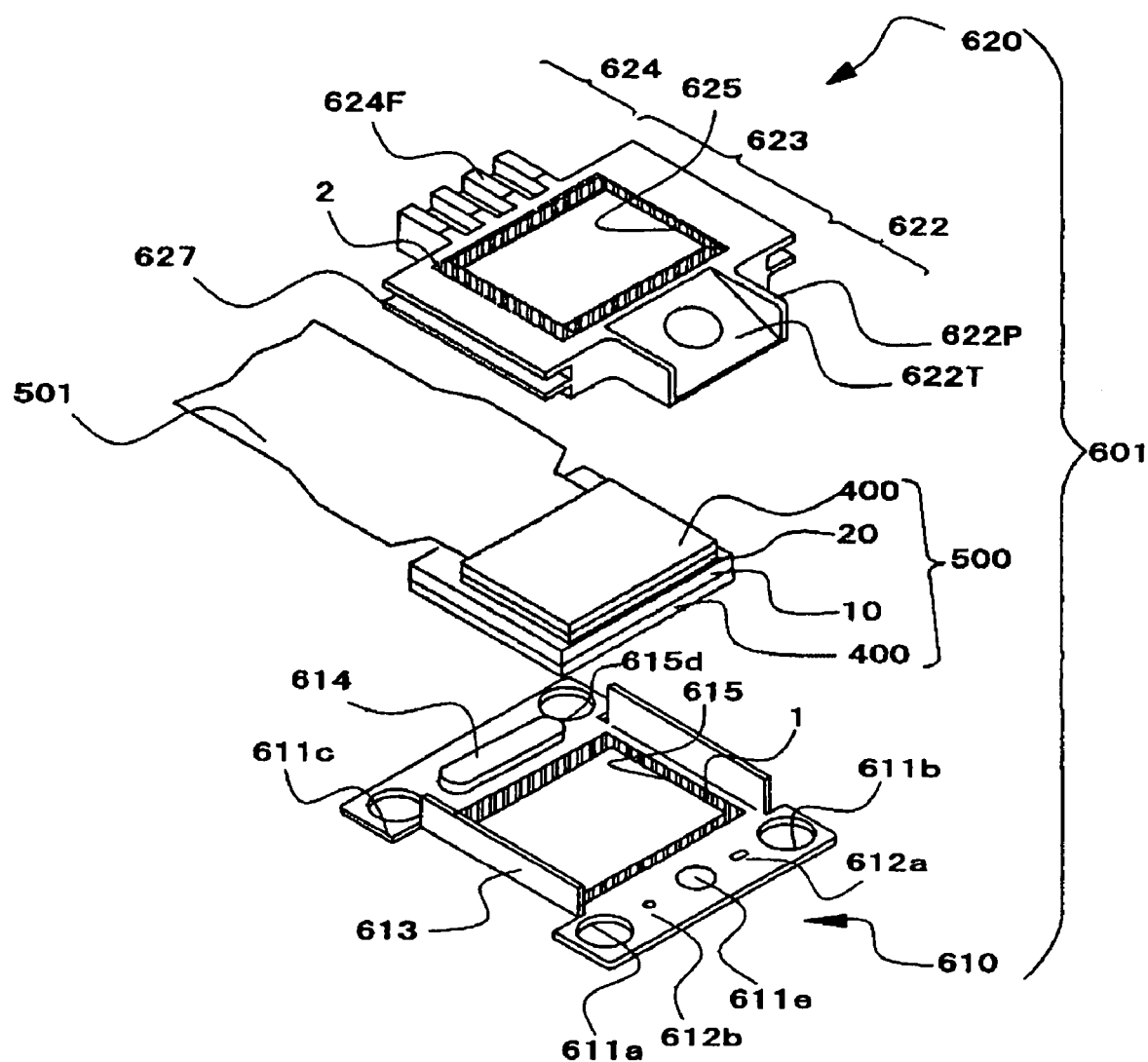
FIG. 4 is an exploded perspective view illustrating an electro-optical device together with a mounting case according to an exemplary embodiment of the present invention.
Figure 5:
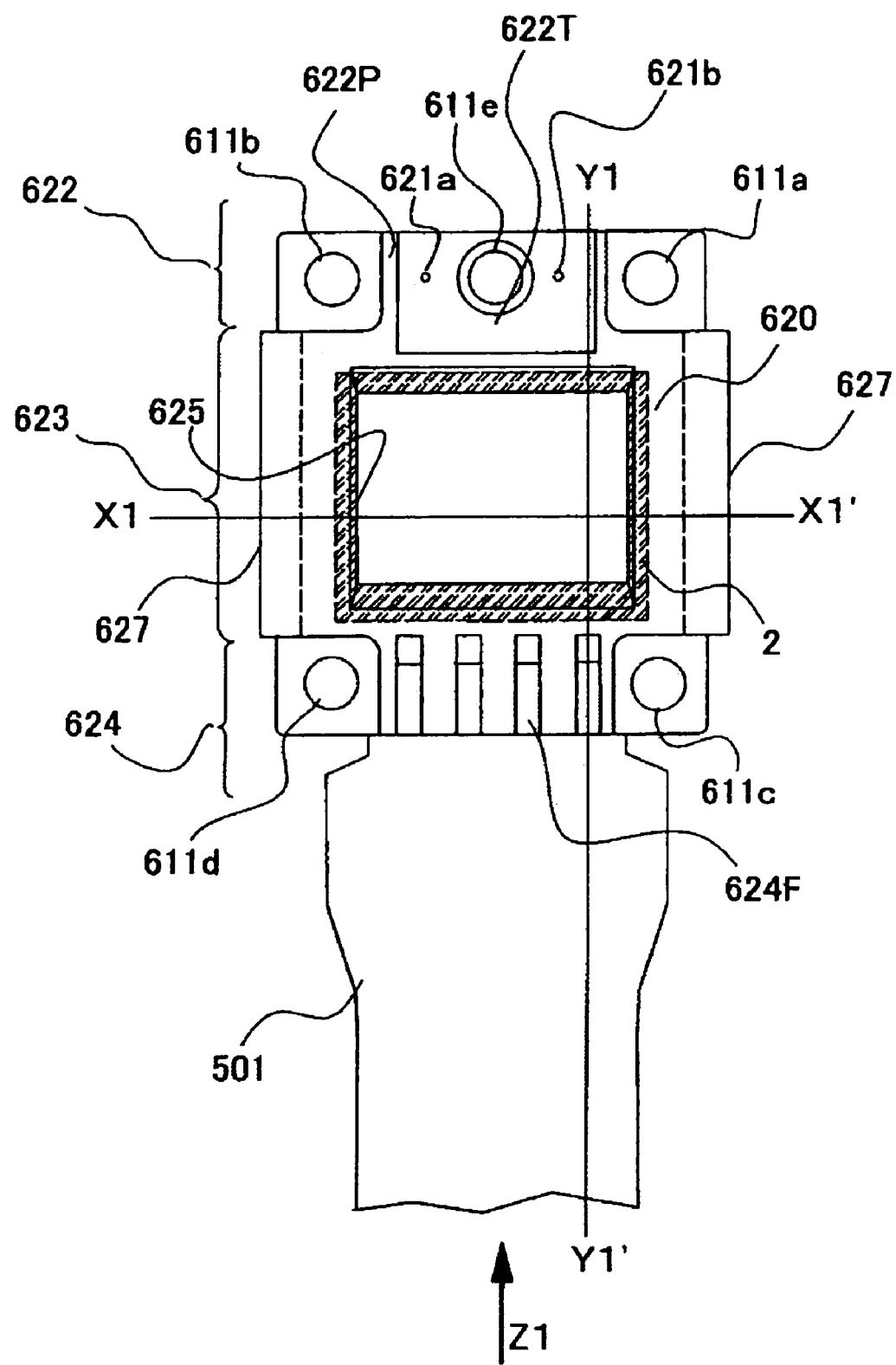
FIG. 5 is a front view of the electro-optical device encased in the mounting case according to the exemplary embodiment of the present invention.
Figure 6:
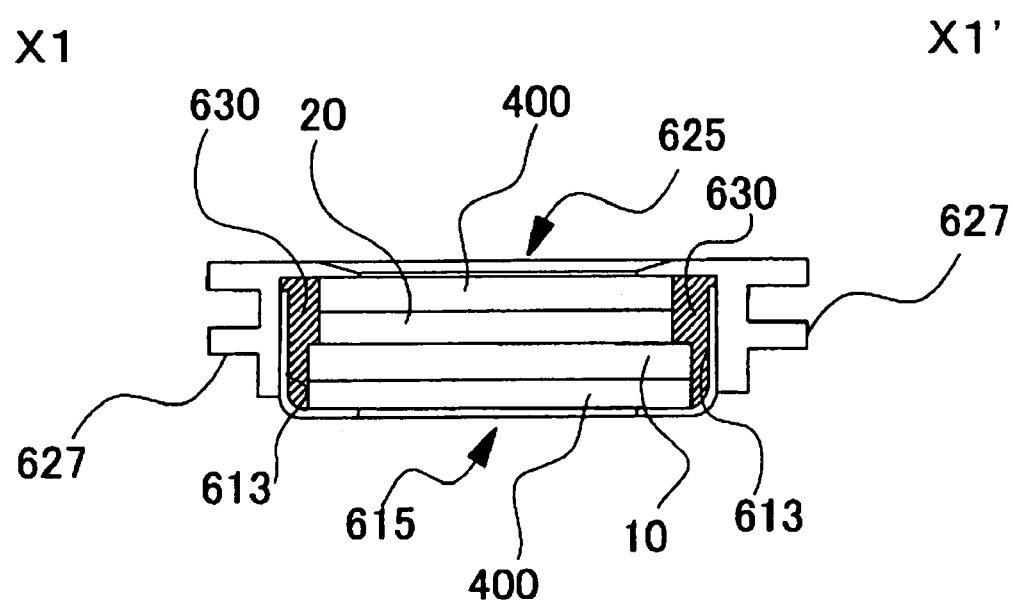
FIG. 6 is a cross-sectional view taken along the plane X1-X1' shown in FIG. 5.
Figure 7:
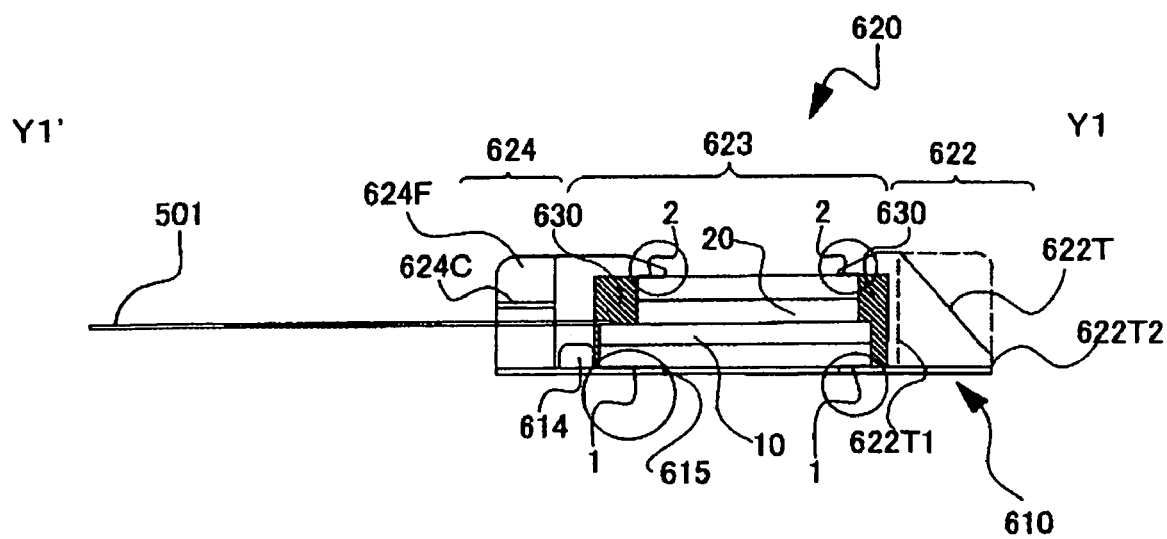
FIG. 7 is a cross-sectional view taken along the plane Y1-Y1' shown in FIG. 5.
Figure 8:
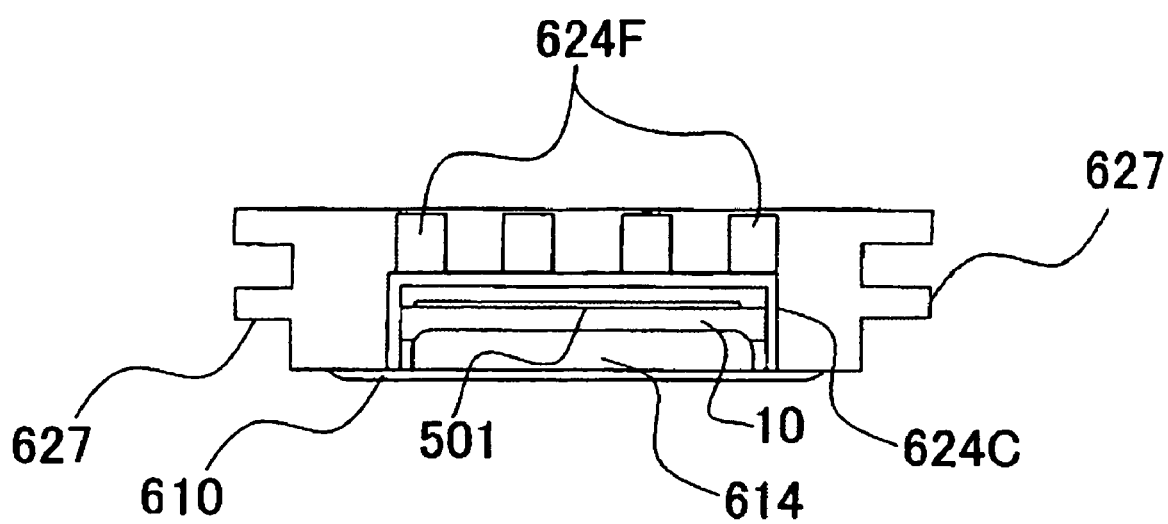
FIG. 8 is a back view shown from the direction of Z1 shown in FIG. 5.
Figure 9:
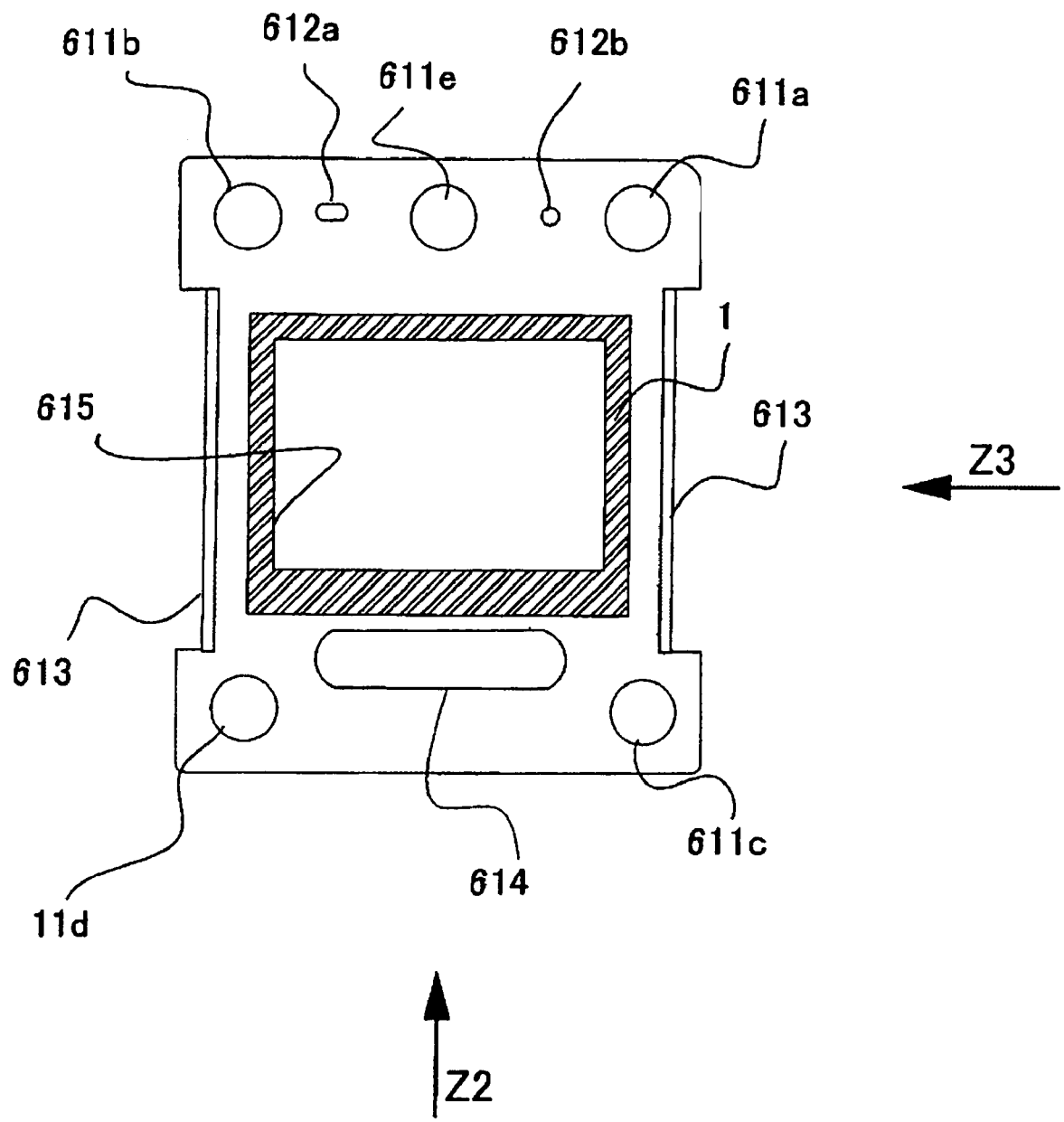
FIG. 9 is a front view of a plate member constituting the mounting case according to an exemplary embodiment of the present invention.
Figure 10:
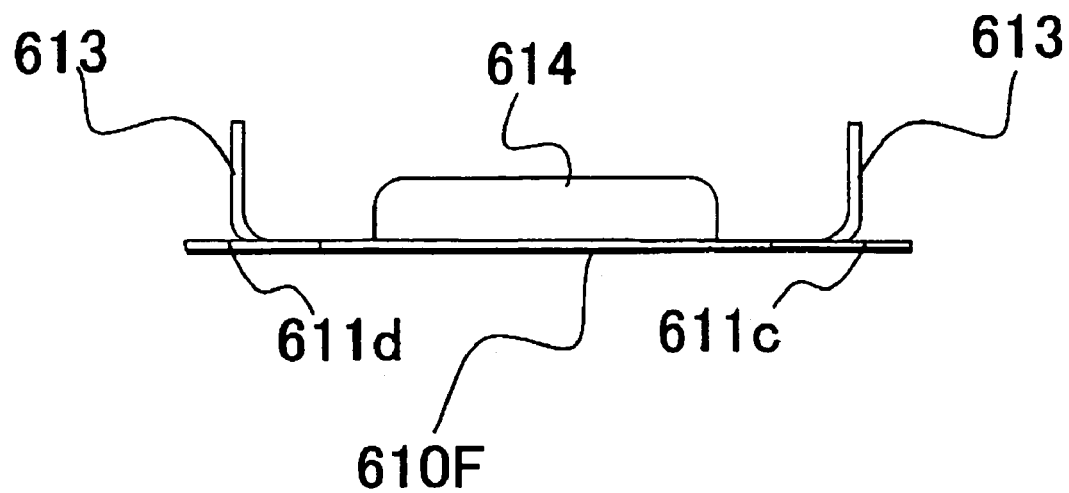
FIG. 10 is a back view shown from the direction of Z2 shown in FIG. 9.
Figure 11:
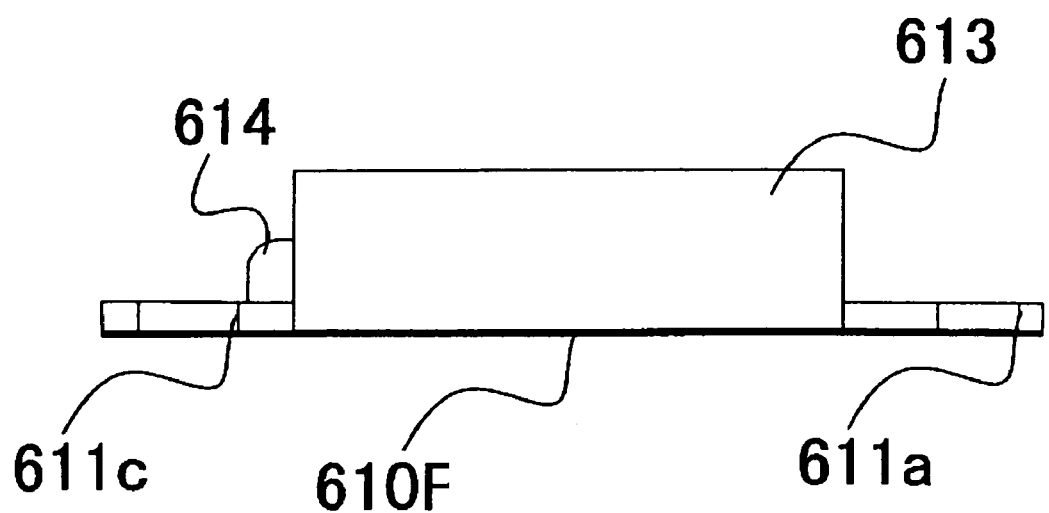
FIG. 11 is a side view shown from the direction of Z3 shown in FIG. 9.

First, a basic construction of the mounting case according to an exemplary embodiment of the present invention will be described with reference to FIGS. 4 to 11. Herein, FIG. 4 is an exploded perspective view illustrating an electro-optical device together with a mounting case according to the present exemplary embodiment. FIG. 5 is a front view of the electro-optical device encased in the mounting case. FIG. 6 is a cross-sectional view taken along the plane X1-X1' shown in FIG. 5. FIG. 7 is a cross-sectional view taken along the plane Y1-Y1' shown in FIG. 5. FIG. 8 is a back view shown from the direction of Z1 shown in FIG. 5. Furthermore, FIG. 9 is a front view of a plate member constituting the mounting case. FIG. 10 is a back view shown from the direction of Z2 shown FIG. 9. FIG. 11 is a side view shown from the direction of Z3 shown in FIG. 9. Moreover, FIGS. 4 to 8 illustrate the mounting case in which electro-optical devices are accommodated.

As shown in FIGS. 4 to 8, the mounting case 601 includes the plate member 610 and the cover member 620. The electro-optical device 500, which is accommodated in the mounting case 601, includes another optical component, such as a reflection preventing plate overlapped with the surface thereof, and an external circuit connecting terminal, to which a flexible connector 501 is connected, in addition to the electro-optical devices shown in FIGS. 2 and 3. Furthermore, a polarizing plate or a phase difference plate may be provided to the optical system of the liquid crystal projector 1100, or it may be overlapped with the surface of the electro-optical device 500.

Moreover, a dustproof substrate 400 is provided to portions not facing the liquid crystal layers 50 in the TFT array substrate 10 and the counter substrate 20 (see FIGS. 4 and 6). The dustproof substrate 400 is constructed to have a predetermined thickness. The dustproof substrate reduces or prevents dirt or dust around the electro-optical device 500 from directly sticking onto the surface of the electro-optical device. Therefore, it is possible to effectively remove a defect that a figure of dirt or dust appears on the magnified projection image. Since the dustproof substrate 400 has the predetermined thickness, the dustproof substrate has a defocusing function to deviate the focus of the source light or the vicinity thereof from a location where dirt or dust exists, that is, from the surface of the dustproof substrate 400.

As shown in FIG. 4, the electro-optical device 500 including the TFT array substrate 10, the counter substrate 20, and the dustproof substrate 400 is accommodated in the mounting case 601 including the plate member 610 and the cover member 620. However, as shown in FIGS. 6 and 7, a molding member 630 is filled between the electro-optical device 500 and the mounting case 601. The molding member 630 ensures the bonding between the electro-optical device 500 and the mounting case 601 and reduces or prevents the occurrence of positional deviation of the electro-optical device 500 within the mounting case 601.

In the present exemplary embodiment, it is assumed that the light that is incident on the cover member 620, passes through the electro-optical device 500, and emits from the plate member 610. That is, referring to the FIG. 1, the component facing the dichroic prism 1112 is not the cover member 620 but the plate member 610.

Now, the construction of the plate member 610 and the cover member 620 constituting the mounting case 601 will be described in more detail.

First, as shown in FIGS. 4 to 11, the plate member 610 is a member having a substantially quadrilateral shape in plan view and is disposed to face one surface of the electro-optical device 500. In the first exemplary embodiment, the plate member 610 and the electro-optical device 500 are directly abutted against each other, and the latter is mounted on the former.

More specifically, the plate member 610 includes a window 615, a strength reinforcement portion 614, a bent portion 613, a cover-member-fixing hole 612, and attaching holes 611a to 611d and 611e.

The window 615 is formed in an opened shape in which a portion of the member having a substantially quadrilateral shape is opened. For example, the window 615 is a member to enable the light to transmit from the upper side to the lower side in FIG. 6. The light can pass through the electro-optical device 500 by the window 615. When the electro-optical device 500 is mounted on the plate member 610, the peripheral region around the image display region 10a in the electro-optical device 500 abuts against the edge of the window 615. The plate member 610 holds the electro-optical device 500 in this manner. Moreover, in this regard, according to the present exemplary embodiment, particularly, a double coated adhesive tape 1 is provided around the border or the peripheral region of the window 615, and a plate member 610 are bonded to an electro-optical device 500 by such a double coated adhesive tape 1. These points will be described below.

The bent portion 613 is a portion formed by bending a portion of each of two opposite sides of the member having the substantially quadrilateral shape toward the inside of the quadrilateral shape. The outer surface of the bent portion 613 is abutted against the inner surface of the cover member 620 when bonding the plate member 610 to the cover member 620 (see FIG. 6). The inner surface of the bent portion 613 is abutted against the outer surface of the electro-optical device 500 through the molding member 630 (see FIG. 6). In this manner, the location of the electro-optical device 500 on the plate member 610 is roughly determined.

In addition, since the inner surface of the bent portion 613 is abutted against the outer surface of the electro-optical device 500 through the molding member 630, the absorption of heat from the former to the latter is available. Specifically, the plate member 610 can function as a heat sink for the electro-optical device 500. Thus, it is possible to reduce or prevent the accumulation of heat in the electro-optical device 500 due to the intensive light radiation from the lamp unit 1102 to the electro-optical device 500.

In addition, since the outer surface of the bent portion 613 abuts against the inner surface of the cover member 620 as described above, the heat transfer from the former to the latter is available. The heat radiation from the electro-optical device 500 is performed by the amount corresponding to heat capacitances of both of the plate member 610 and the cover member 620, so that the cooling of the electro-optical device 500 can be very effectively performed.

The strength reinforcement portion 614 has a three-dimensional shape formed by a process of convexing a portion of the member having the substantially quadrilateral shape higher than other portions in plan view. In this way, the strength of the plate member 610 is reinforced. The strength reinforcement portion 614 may be disposed at a location to substantially abut against one side of the electro-optical device 500 (see FIG. 7). However, strictly speaking, both of them do not abut against each other in FIG. 7. In this regard, the position of the electro-optical device 500 on the plate member 610 is decided to some degree by a strength reinforcement portion 614 as well as a bent portion 613.

The cover-member-fixing hole portion 612 is a hole portion to engage with a convex portion 621 provided at the corresponding location in the cover member 620. The plate member 610 and the cover member 620 are fixed to each other by engaging the cover-member-fixing hole portion 612 with the convex portion 621. In addition, in the present exemplary embodiment, the cover-member-fixing hole portion 612 includes two holes as shown in each figure. In case of a need to distinguishing the holes, the two holes are referred to as cover-member-fixing holes 612a and 612b, respectively. Corresponding to the holes, the convex portion 621 includes two convex portions. In case of a need to distinguishing the convex portions, the two convex portions are referred to as convex portions 621a and 621b, respectively.

The attaching holes 611a to 611d are used to attach the electro-optical device encased in the mounting case within the liquid crystal projector 1100 as shown in FIG. 1. In the present exemplary embodiment, the attaching holes 611a to 611d are provided to four corners of the member having a substantially quadrilateral shape. In addition to the attaching holes 611*a* to 611*d*, an attaching hole 611*e* is provided in the present exemplary embodiment. The attaching hole 611*e* is disposed to form a triangle together with the attaching holes 611*c* and 611*d* of the attaching holes 611*a* to 611*d*. In other words, the attaching holes 611*e*, 611*c*, and 611*d* are disposed as the corresponding apexes of the triangle.

In this manner, in the present exemplary embodiment, it is possible to fix the four points at the four corners using the attaching holes 611*a* to 611*d* and to fix the three points at the three corners using the attaching holes 611*e*, 611*c*, and 611*d*.

Then, particularly, in the present exemplary embodiment, such a plate member 610 has the following feature. Namely, the plate member 610 according to the present exemplary embodiment has the outmost surface with black color. Herein, the "outmost surface" is a paint-coated surface by a painting when the surface of the plate member 610 is coated with black color. Further, the "outmost surface," which is a portion of the plate member 610, includes, for example, a light-emitting surface of the plate member 610, and the light-emitting surface is, for example, a surface, which is shown in FIG. 10 or 11 and is indicated as a reference numeral 610F. In addition, as not shown in FIG. 9, the surface corresponds to the back of a paper.

Moreover, it is preferable that the "outmost surface" should also include a light incident surface opposite thereto. The outmost surface corresponds to the surface shown in FIG. 9.

As described above, since the outmost surface of the plate member 610 is black in color, useless light reflection from the plate member 610 can be reduced or prevented. Thus, it is possible to enhance image quality. For instance, as described above, when the light emitting surface 610F is black in color, it is possible to reduce or prevent a situation where the light transmitted through the window 615 of the plate member 610 or light, from the viewpoint of the returned light reflected on any element of the liquid crystal projector 1100 or one of light valves 100R, 100G, and 100B shown in FIG. 1, emitted from other two valves and incident on the one is reflected from the light-emitting surface 610F of the plate member 610 and then the useless reflected light is mixed into projection images. Alternatively, when the surface of light incident part is black in color, it is possible to reduce or prevent a situation where light is incident on the electro-optical device from a light-emitting surface of the electro-optical device, the situation not occurring from the first. As a result, it is possible to previously reduce or prevent light incidence on TFTs built on a TFT array substrate constituting an electro-optical device, thereby enabling characteristics thereof to be maintained. Further, as described above, it is possible to evade a situation where the reflected light is reflected from the electro-optical device, etc. again and thus the light is finally mixed into images.

As described above, in accordance with the present exemplary embodiment, it is possible to display higher-quality image without the deterioration of image quality.

Further, in order to form the light-emitting surface 610F with black color, it is possible to use, for example, devices to coat black paint or device to paint with proper metal, such as nickel, chrome, and zinc (which will be described later), and other devices or structures.

Next, the cover member 620, which is a member having a substantially cubical shape, is disposed to face the other surface of the electro-optical device 500 as shown in FIGS. 4 to 11.

The cover member 620 is preferably made of light shielding resin, metallic material, and the like in order to reduce or prevent the leakage of the light in the peripheral region of the electro-optical device 500 and the introduction of the stray light from the peripheral region to the image display region 10*a*. Since it is preferable that the cover member 620 should function as a heat sink for the plate member 610 or the electro-optical device 500, the cover member 620 is preferably made of materials of relatively high heat conductivity, such as aluminum, magnesium, copper, or an alloy thereof.

More specifically, the cover member 620 includes the convex portion 621, a cover main body 623, a cooling air introducing portion 622, and a cooling air discharging portion 624. The convex portion 621 is used to fix the plate member 610 and includes two convex portions 621*a* and 621*b* at the locations corresponding to the cover-member-fixing holes 612*a* and 612*b*. The convex portion 621 according to the present exemplary embodiment is provided to form a portion of the cooling air introducing portion 622 or a tapered portion 622T to be described later in FIG. 5. In FIG. 5, although the convex portion 621 is not normally shown, it is particularly shown in FIG. 5.

As shown in FIGS. 4 to 7, a cover main body 623, which is generally a cubic-shaped member, is arranged between the cooling air introducing portion 622 and the cooling air discharging portion 624, as will be described below. The inside of the rectangular parallelepiped shape, in which the electro-optical device 500 is accommodated, is in the so-called hollow state. Strictly speaking, the cover main body 623 is a member having a lid-free box shape. The "cover" in this expression may be considered to correspond to the plate member 610 described above.

More specifically, the cover main body 623 has a window 625 and a side fin portion 627. The window 625, in which a bottom surface having the box shape (a "top surface" in FIG. 4 or 6) is opened, is a member capable of allowing light to penetrate from the upper side to the lower side in FIG. 6. The light emitted from the lamp unit 1102 within the liquid crystal projector 1100 shown in FIG. 1 can be incident to the electro-optical device 500 through the window 625. In addition, in the cover main body 623 having the window 625, the peripheral region near the image display region 10*a* in the electro-optical device 500 may be preferably formed to abut against the edge of the window 625 similar to the description of the window 615 in the plate member 610. In this way, the cover main body 623, more particularly, the edge of the window 625 can also hold the electro-optical device 500. Further, in this regard, according to the present exemplary embodiment, particularly, similar to the window 615 of the plate 610 described above, a double coated adhesive tape 2 is also provided on the border or the peripheral region of a window 625 of a cover member 620, and the cover member 620 are bonded to an electro-optical device 500 by such a double coated adhesive tape 2. These points will also be described below.

On the other hand, side fin portions 627 are formed at both sides of the cover main body 623. Herein, the both sides are referred to sides where a cooling air introducing portion 622 and a cooling air discharging portion 624 to be described later, do not exist. As shown in FIG. 4 or 6, such side fin portions 627, more particularly, include a protrusion part where a plurality of linear-shaped protrusion portions protrudes from the side in a direction from the cooling air introducing portion 622 to the cooling air discharging portion 624, the protrusion portions being parallel to each other (in FIG. 4, etc., two linear shaped protrusion portions at one side are parallel to each other). In this regard, the surface area of the cover main body 623 and the cover member 620 increases.

In addition, as described above, the inner surface of the cover member 620 abuts against the outer surface of the bent portion 613 in the plate member 610 in the process of adhering the cover member 620 to the plate member 610 (see FIG. 6). In such a case, the "inner surface of the cover member 620" corresponds to the inner surface of the cover main body 623.

As shown in FIG. 4 or 7, the cooling air introducing portion 622 is composed of a tapered portion 622T and a baffle plate 622P. In the present exemplary embodiment, the tapered portion 622T has the shape of a substantially triangular prism with its bottom being a right triangle. In addition, the tapered portion 622T has an appearance where one side of the triangular prism in the tapered portion 622T is attached on the one side of the cover main body 623. In this case, the one side of the triangular prism includes a side interposed between a rectangular portion of the bottom of the triangular prism and a corner portion adjacent thereto. Therefore, the tapered portion 622T has a shape including a base portion 622T1 at the highest height of the side of the cover main body 623 and a tip 622T2 at the height gradually lowered therefrom. Herein, the term "height" is a distance in an top-bottom direction in FIG. 7. In FIG. 7, a dotted line extending in the top-bottom direction is represented as a reference. On the other hand, the baffle plate 622P has a shape of a wall erected along one side between two angles except for the rectangular portion on the bottom of the triangular prism. In terms of the aforementioned "height", the height of the baffle plate 622P is constant at any place between the base portion 622T1 and the tip 622T2 although the height of the tapered portion 622T is gradually lowered from the base portion 622T1 to the tip 622T2.

Finally, the cooling air discharging portion 624 includes a flexible connector leading portion 624C and a rear fin portion 624F as shown in FIG. 4, 5, or 8. The flexible connector leading portion 624C is provided on one side of the cooling air discharging portion to face the side of the cover main body 623 on which the tapered portion 622T is provided. Specifically, a member having a cross-sectional shape of "U" on the side is attached by an aperture having a cross-sectional shape of "U" in the downward direction of FIG. 8 as shown in FIG. 8. A flexible connector 510 connected to the electro-optical device 500 is drawn out from the space surrounded in the shape of "U".

On the other hand, the rear fin portion 624F is provided on the so-called ceiling plate having the cross-sectional shape of "U" in the flexible connector leading portion 624C. More specifically, as shown in FIG. 4, 5, or 8, the rear fin portion 624F has a plurality (four in FIG. 4, etc.) of straight protrusion portions, which protrude from the ceiling plate in parallel, so as to correspond to the extending direction of the straight protrusion portions of the side fin portions 627 described above. In this way, the surface area of the cover member 620 increases.

Figure 12:
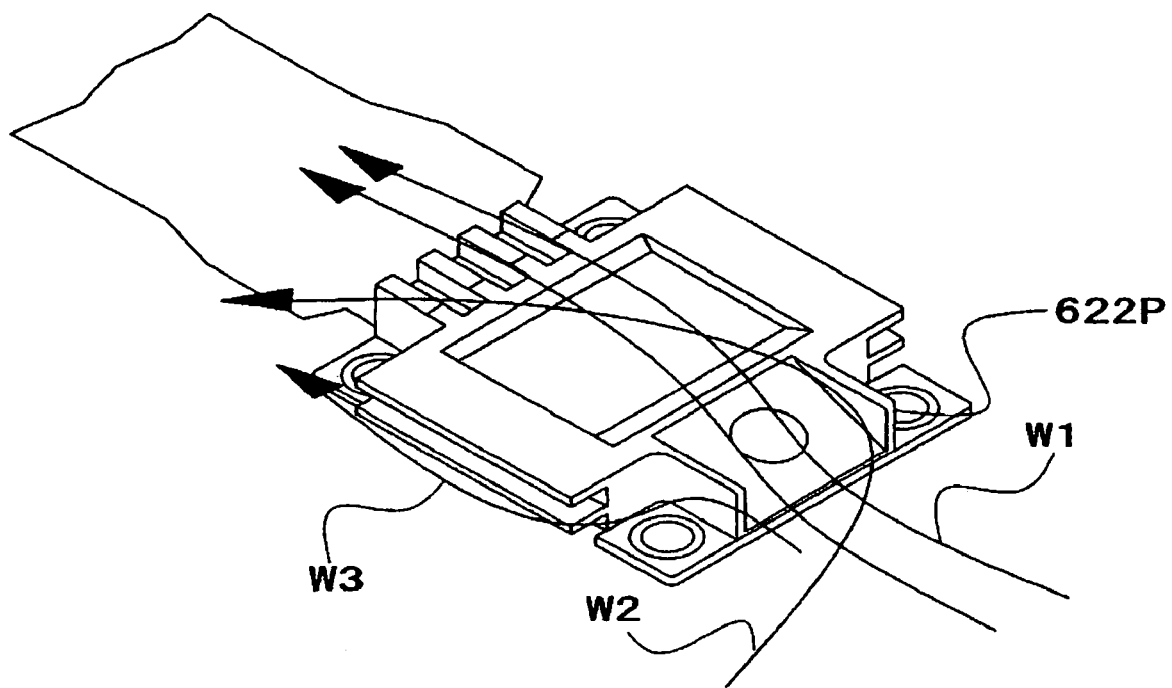
FIG. 12 is a perspective view of the electro-optical device encased in the mounting case according to an exemplary embodiment of the present invention and illustrates the flow of air to the electro-optical device encased in the mounting case.

Since the cover member 620 has the aforementioned construction, the wind blown from the fan 1300 provided in the liquid crystal projector 1100 shown in FIG. 1 flows as shown in FIG. 12 in the vicinity of the mounting case 601 or the cover member 620. Herein, FIG. 12 is a perspective view of an electro-optical device encased in a mounting case and illustrates the typical flow of wind into the electro-optical device encased in the mounting case. In addition, in the liquid crystal projector 1100 shown in FIG. 1, in order to implement the flow of the cooling air as shown in FIG. 12, it is necessary to provide the electro-optical device encased in the mounting case, that is, light valves 100R, 100G, and 100B such that the outlets 100RW, 100GW, and 100BW described above with reference to FIG. 1 face the cooling air introducing portion 622 constituting the cover member 620.

First, as the cooling air flows up the tapered portion 622T of the cooling air introducing portion 622, the cooling air is blown to the cover main body 623 by which the surface of the electro-optical device 500 is exposed (see a reference numeral W1). In addition, since the baffle plate 622P is provided to the cooling air introducing portion 622, the cooling air blown in any direction can be guided on the tapered portion 622T, and moreover, into the cover main body 623 (see a reference numeral W2). As described above, in accordance with the present exemplary embodiment, it is possible to efficiently send the wind to the cover main body 623, and to directly deprive the heat of the electro-optical device 500, that is, to cool down it, and to efficiently deprive the heat accumulated in the cover member 620.

The wind, which is in the outside of the baffle plate 622P of the cooling air introducing portion 622, that is, in the side of not facing the tapered portion 622T (see reference numeral W3), or the wind, which reaches the surface of the electro-optical device 500 or the vicinity thereof as described above and then flows by the side of the cover main body 623, reaches the side fin portion 627. As described above, since the side fin portion 627 has the straight fins and the surface area of the cover main body 623 increases, it is possible to effectively cool the cover main body 623 or the cover member 620. In addition, as described above, the wind, which reaches the surface of the electro-optical device 500 or the vicinity thereof and then, as it is, blows away from the end portion of the cover main body 623, reaches the rear fin portion 624F (see a reference numeral W1). Since the rear fin portion 624F has the straight protrusion portion and the surface area of the cooling air discharging portion 624 increases as described above, it is possible to effectively cool the cooling air discharging portion 624 and the cover member 620.

As describe above, it is possible to effectively cool the mounting case 601 according to the present exemplary embodiment using the cooling air as a whole. In addition, such a cooling method is very effective in externally radiating the heat transferred to the electro-optical device 500, the plate member 610, and the cover member 620 in this order as described above. Since the cover member 620 can be effectively cooled, the flow of heat, which is transferred from the electro-optical device 500 to plate member 610 or the cover member 620 through the bent portion 613, can be effectively maintained at any time. In other words, since the cover member 620 is suitably cooled in a normal state, its function as a heat sink can be maintained at any time. Thus, the heat radiation from the plate member 610, and moreover, from the electro-optical device 500 can be effectively performed as seen from the cover member 620.

Therefore, in the present exemplary embodiment, since the heat is not excessively accumulated in the electro-optical device 500, the deterioration of the liquid crystal layers 50 and the occurrence of the hot spots can be prevented. Thus, the deterioration of images can be greatly reduced.

Next, in the present exemplary embodiment, particularly, in order to further enhance the function of radiating the heat from such an electro-optical device, i.e., function as a heat sink of the plate member 610 and the cover member 620, the plate member 610 includes the following structure. That is, as shown in FIG. 9 or 4, in the plate member 610 according to the present exemplary embodiment, the double coated adhesive tape 1 is provided on the border of the window 615, i.e., a portion on which the electro-optical device 500 is placed (in particular, FIG. 7 shows the arrangement of the double coated adhesive tape 1 as seen from a section. Refer to the inside of the circle shown in FIG. 7). A peripheral region, which is positioned at the circumference of an image display region 10a in the electro-optical device 500, abuts against the border of the window 615, so that the electro-optical device 500 can be bonded to the plate member 610 by such a double coated adhesive tape 1.

Further, as shown in FIG. 5 or 4, in the present exemplary embodiment, a double coated adhesive tape 2 is also provided on the border of the window 625 of the cover member 620. In addition, refer to the inside of the circle shown in FIG. 7. As mentioned above, similarly to the relationship between the plate member 610 and the electro-optical device 500, it is preferable that the border of the window 625 should abut against the peripheral region of the electro-optical device 500. As a result, in the present exemplary embodiment, the cover member 620 is also bonded to the electro-optical device 500 by the double coated adhesive tape 2.

Both double coated adhesive tapes 1 and 2 have a rectangular shape surrounding the whole borders of the window 615 and 625, i.e., the apertures of the windows 615 and 625. As seen from the electro-optical device 500, the double coated adhesive tapes 1 and 2 are provided to correspond to the whole peripheral region of the electro-optical device 500.

Further, the double coated adhesive tapes 1 and 2 according to the present exemplary embodiment have the following characteristics. That is, firstly, the double coated adhesive tapes 1 and 2 are made of a material having the heat conductivity of 0.6 W/m·K or more, more preferably, 1.0 W/m·K or more. The materials satisfying such requirements includes, for example, a material, which contains heat conductive silicon rubber, and a material, which contains the heat conductive silicon rubber and has a multi-layered structure in which the materials of a bonding layer and a layer to be bonded are changed. In addition, the so-called acryl-based heat conductive double coated adhesive tape, which includes acryl rubber as a main body and can additionally include metal oxide or metal nitride, is used. Furthermore, F-CO ™ SHEET supplied by F-CO Co., Ltd. or TCATT heat conductive adhesive transfer tapes (Product Nos. 9882, 9885, 9890) supplied by SUMITOMO 3M Co., Ltd. can be used as such double coated adhesive tapes. Secondly, the thickness of such double coated adhesive tapes is in the range of 50 to 200 μm.

An electro-optical device encased in a mounting case of the present exemplary embodiment having such a configuration has the following effect. Firstly, because the double coated adhesive tapes 1 and 2 have a rectangular shape surrounding the windows 615 and 625, i.e., a shape corresponding to the whole peripheral region of the electro-optical device 500, the double coated adhesive tapes 1 and 2 are bonded to the electro-optical device 500 or the plate member 610 and the cover member 620 over a wide range. Thus, the adhesion between the electro-optical device 500 and the plate member 610 and the adhesion between the electro-optical device 500 and the cover member 620 are securely and tightly attained by the double coated adhesive tapes 1 and 2 having a relatively broader area described above. In particular, when an electro-optical device encased in a mounting case is constructed inside a liquid crystal projector 1100, relatively intense tension acts on a flexible connector 501 extended from an electro-optical device. However, because the above-described double coated adhesive tapes 1 and 2 are provided in an aspect of the present invention, there is an advantage that the electro-optical device 500 encased in a mounting case 601 does not easily deviate from the predetermined position under the relatively intense tension.

Secondly, as described above, since the double coated adhesive tapes 1 and 2 are made of a material having higher heat conductivity, it is possible to efficiently transfer heat from the electro-optical device 500 to the plate member 610, or from the electro-optical device 500 to the cover member 620.

Moreover, as described above, when the double coated adhesive tapes 1 and 2 have the relatively wide area in a rectangular shape and the thickness of the double coated adhesive tapes 1 and 2 are in the range of 50 to 200 μm, the heat transfer effect described above is enhanced.

Preferentially, according to the former "rectangular shape," because the adhesion between the electro-optical device 500 and the double coated adhesive tape 1 or 2, or the adhesion between the plate member 610 and the double coated adhesive tape 1 and the adhesion between the cover member 620 and the double coated adhesive tape 2 are made over a wide range, respectively, heat is more efficiently transferred.

Figure 13:
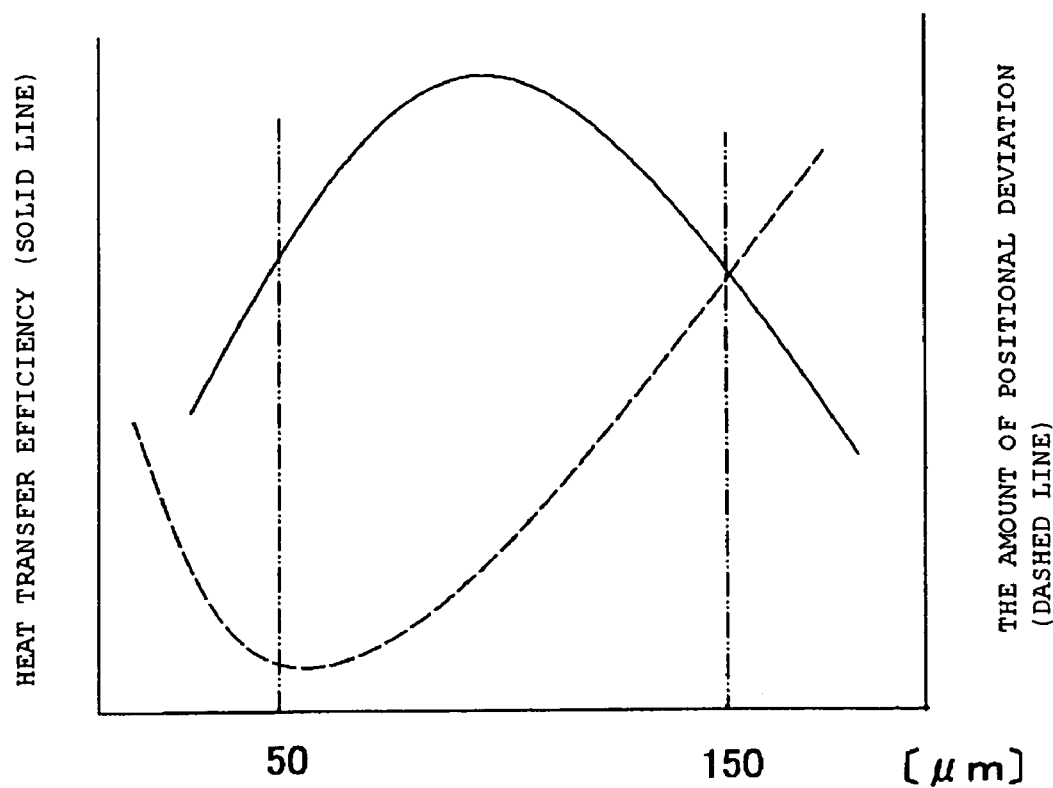
FIG. 13 is a graph qualitatively showing the variation of heat transfer efficiency from an electro-optical device to a plate or a cover and the position deviation amount of the electro-optical device within the mounting case depending on the thickness variation of a double coated adhesive tape.

Further, according to the thickness limitation of the double coated adhesive tapes 1 and 2 of the latter, the heat transfer from the electro-optical device 500 to the plate member 610 or the heat transfer from the same device 500 to the cover member 620 is efficiently accomplished due to the following conditions. Hereinafter, these will be described with reference to FIGS. 13 and 14. Herein, FIG. 13 is a graph qualitatively showing the variation of heat transfer efficiency from the electro-optical device 500 to the plate member 610 or the cover member 620 and the position deviation amount of the electro-optical device 500 within the mounting case 610 depending on the thickness variation of the double coated adhesive tape. Further, FIG. 14 is a partially enlarged view of a left bottom circle of four circles shown in FIG. 5, (A) shows a case where the double coated adhesive tape is relatively thin (less than 50 μm), and (B) shows a case where the double coated adhesive tape is relatively thick (more than 200 μm).

Figure 14A:
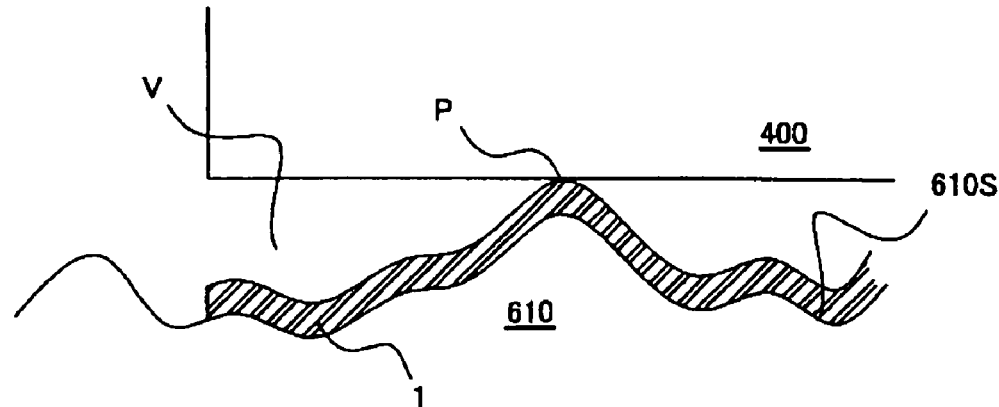
FIG. 14 is a partially enlarged view of a left bottom circle of four circles shown in FIG. 5, (A) shows a case where the double coated adhesive tape is relatively thin (less than 50 μm), and (B) shows a case where the double coated adhesive tape is relatively thick (more than 200 μm)
Figure 14B:
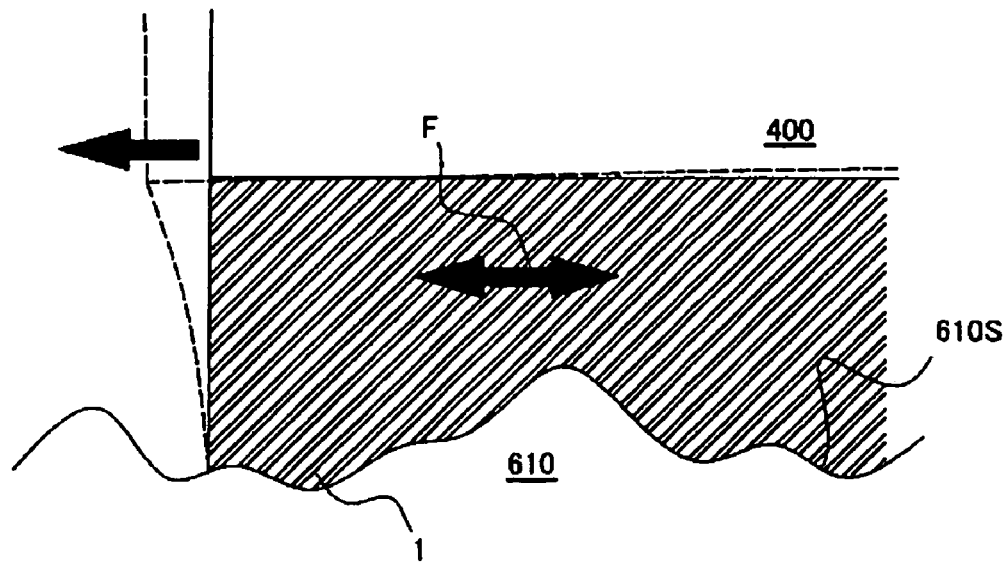

However, the relationship between the thickness of the double coated adhesive tape and the heat transfer efficiency or the amount of positional deviation is similar to that of FIG. 13, the main reason is that a surface of the plate member 610 has random unevenness 610S as shown in FIGS. 14(A) and 14(B). Herein, the unevenness 610S is extremely fine which may occur due to an inherent rough surface of an original material constituting the plate member 610. Further, in this regard, typically, the surface inaccuracy of a dustproof substrate 400 made of quartz or glass is extremely satisfactory. As shown in FIGS. 14(A) and 14(B), in view of a difference in height of the unevenness 610S on the surface of the plate member 610, most of the unevenness 610S is presumed to be even.

Based on such unevenness 610S, provided that the thickness of the double coated adhesive tape 1 is less than 50 μm, a portion of the double coated adhesive tape 1 is buried in the concave portions of the unevenness 610S. Thus, the whole surface thereof cannot be bonded to the dustproof substrate 400. Conversely, as shown in FIG. 14(A) as a reference numeral P, the dustproof substrate 400 is bonded to the double coated adhesive tape 1 at only the tops of convex portions. Thus, the adhesion between the two becomes weak, and the mount of the positional deviation of the electro-optical device 500 encased in the mounting case 1 becomes relatively big (refer to a dashed line shown in FIG. 13). Further, in such a case, because a gap V between the dustproof substrate 400 and the plate member 610 is formed due to the unevenness 610S for the same reason, the heat transfer efficiency between the two decreases. Thus, the amount of heat transfer from the electro-optical device 500 to the plate member 610 decreases (refer to a solid line shown in FIG. 13).

On the other hand, provided that the thickness of the double coated adhesive tape 1 is more than 200 µm, the adhesion between the plate member 610 and the double coated adhesive tape 1 and the adhesive between the dustproof substrate 400 and the double coated adhesive tape 1 are effectively made respectively because the thickness is enough to compensate for the difference between the high and low of the unevenness 610S. However, in such a case, elastic force, which is shown in FIG. 14(B) as a reference numeral F, generates in the double coated adhesive tape 1, so that a relative positional difference between the plate member 610 and the dustproof substrate 400 may occur (refer to a dashed line shown in FIG. 14(B). The amount of positional deviation monotonously increases depending on the thickness of the double coated adhesive tape 1 (refer to a dashed line shown in FIG. 13). Further, the thicker the double coated adhesive tape 1 becomes, the longer a heat transfer path becomes. Thus, it is considered that heat transfer efficiency decreases (refer to a solid line shown in FIG. 13).

Further, for the convenience of explanation, as described above, although FIG. 14(A) is a partially enlarged view of a left bottom circle of four circles shown in FIG. 5, it is clear that the aforementioned situation can be similarly applied to all four circles as shown in FIG. 5.

In such conditions and a graph shown in FIG. 13, when the thickness of the double coated adhesive tapes 1 (or 2) according to an aspect of the present invention is in the range of 50 to 200 µm, it is most suitable to certainly bond the plate member 610 (or the cover member 620) to the electro-optical device 500 and to effectively transfer heat from the latter to the former.

Further, because the relationship between the thickness of the double coated adhesive tapes 1 and 2 and the heat transfer efficiency or the amount of positional deviation described above mainly depends on the unevenness 610S described above, it is possible to properly change the thickness of the double coated adhesive tapes 1 and 2 in accordance with the size of the unevenness 610S, i.e., the degree of roughness of the outmost surface of the plate member 610 or the cover member 620. Namely, if the surface roughness is small, the above-described inconvenience does not occur even if much thinner double coated adhesive tape 1 or 2 is used. Furthermore, if the surface roughness is large, thicker double coated adhesive tape 1 or 2 can be suitable for use.

Such a point is the core when the thickness of the "double coated adhesive tape" according to an aspect of the present invention is suitably determined. Although the above-described limitation of "the range of 50 to 200 µm" has been proposed as the most suitable value to correspond to the difference in height of the unevenness 610S, it is possible to adjust the thickness in accordance with the degree of the surface roughness if necessary. Further, it is not important that the adjusted value is in excess of the range of the aforementioned numeral value. An aspect of the present invention also includes such a case.

As described above, the electro-optical device 500 is more certainly and tightly bonded to the plate member 610 and the cover member 620, and heat transfer from the former to the latter efficiently proceeds. Thus, it is possible to reduce or prevent the positional deviation of the electro-optical device 500 in the mounting case 601 as much as possible and to effectively cool the electro-optical device 500. As a result, the deterioration of image quality due to the deterioration of liquid crystal does not occur.

Moreover, in accordance with the plate member 610 according to the above-described exemplary embodiment, as mentioned above, a process for making the its outmost surface with black color is performed. However, in view of the relationship between such a point and the double coated adhesive tape 1, it is preferable to effectively attain the operation and effect according to an aspect of the present invention if the following configuration is employed.

That is, in such a case, in order to make the outmost surface of the plate member 610 black, it is preferable to perform a plating process using materials, such as nickel, chrome, zinc, etc. after performing a blast process on the surface of the plate member 610 (hereinafter, referred to Ni plating as a representative). In this regard, first, because random and relatively big unevenness is formed on the surface of the plate member 610 due to the blast process (see FIGS. 14(A) and 14(B)), it is possible to effectively attain the operation of reducing or preventing light reflection described above. Further, as compared with a case of the painting process to obtain black color, it is possible to strongly bond the plate member 610 to the double coated adhesive tape 1 using Ni plating. In accordance with the painting process, paint is easily exfoliated from the surface of the plate member 610. In the present exemplary embodiment, because there is no such trouble, the plate member 610 is more certainly and tightly bonded to the double coated adhesive tape 1. As a result, the plate member 610 can be more certainly and tightly bonded to the electro-optical device 500.

In addition, although the explanation to make the outmost surface of the cover member 620 black is omitted, it is desirable that the cover member 620 also have shading capacity to reduce or prevent the leakage of light in the peripheral region of the electro-optical device 500 and to reduce or prevent stray light from the peripheral region from being incident on the image display region 10*a*. Thus, in an aspect of the present invention, as similar to the plate member 610 described above, it is preferable that a painting process, a plating process, etc. should be performed on the cover member 620 to coat the outmost surface thereof with black. In such a case, in consideration of the relationship between the cover member 620 and the double coated adhesive tape 2, as described above, about the plate member 610, it is also desirable that a blast process and a Ni plating process should be performed on the surface of the cover member 620 to coat the outmost surface of the cover member 620 with black color.

Figure 15:
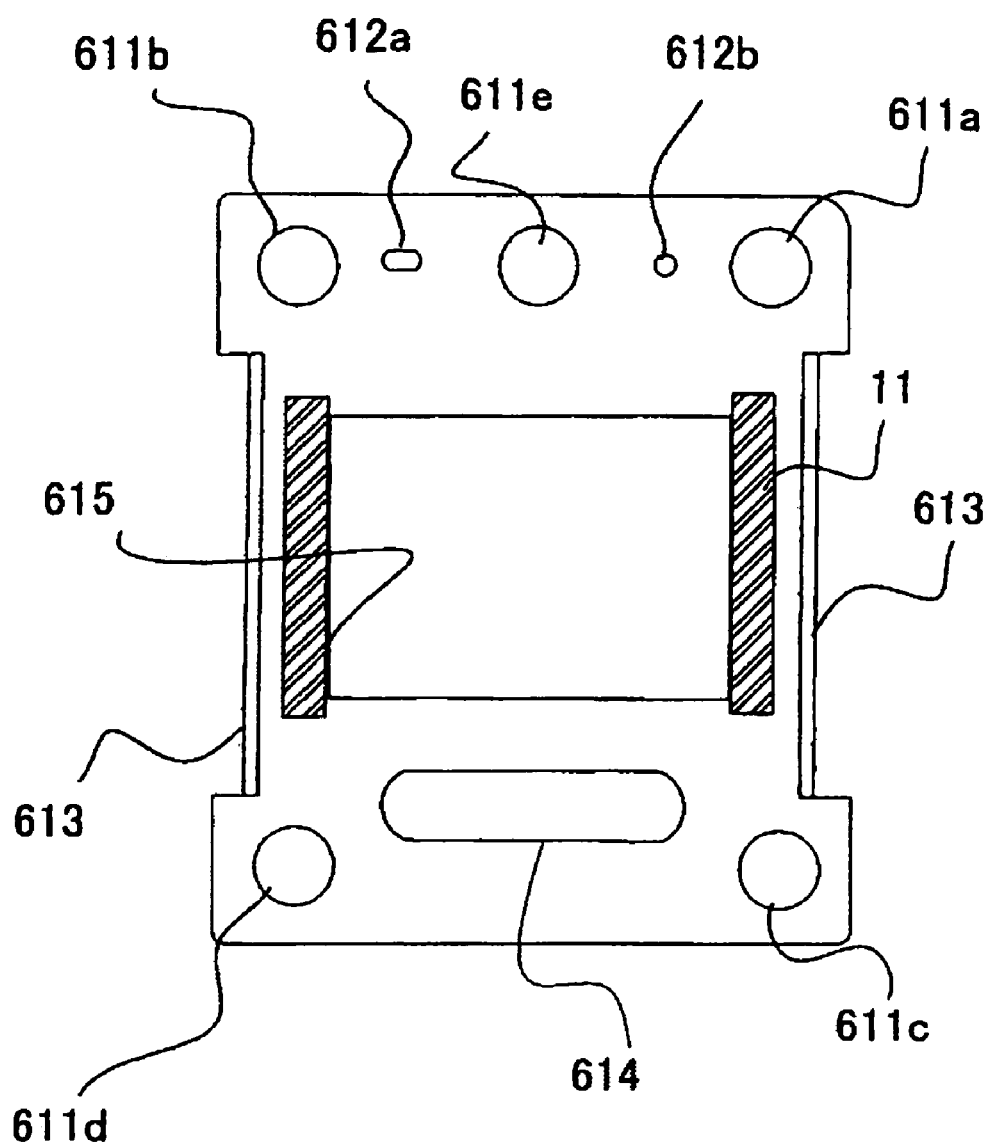
FIG. 15, similar to FIG. 9, is a schematic showing double coated adhesive tapes having a stripe shape in plan view.
Figure 16:
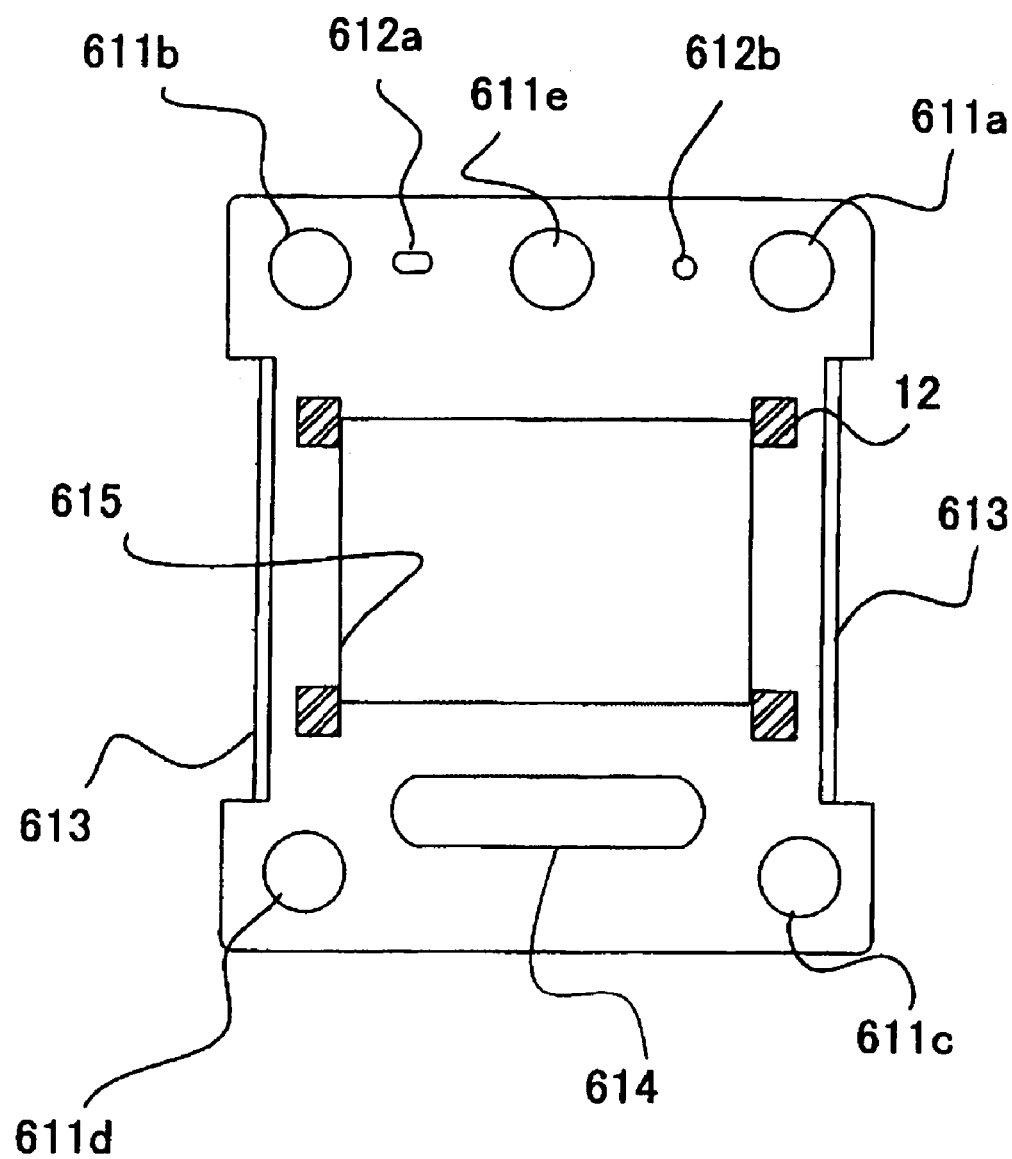
FIG. 16, similar to FIG. 9, is a schematic showing double coated adhesive tapes which are scattered at four corners in plan view.

Further, in the exemplary embodiment described above, although the double coated adhesive tape 1 or 2 has a rectangular shape surrounding the windows 615 and 625, the present invention is not limited to this shape. For example, it is possible to employ shapes shown in FIGS. 15 and 16. Herein, FIGS. 15 and 16 are similar to FIG. 9 except for a planar shape of the double coated adhesive tape. In addition, the plate member 610 to which the double coated adhesive tape is bonded will be described below.

First, in FIG. 15, double coated adhesive tapes 11 are provided at only the vertical regions of the window 615. So to speak, such double coated adhesive tapes 11 have a stripe shape. Moreover, instead of an aspect shown in FIG. 15, it is preferable that the double coated adhesive tapes 11 should be provided at only the horizontal regions of the window 615. Further, in FIG. 16, double coated adhesive tapes 12 are provided to correspond to only four corners of the window 615. However, in such a case, it is not desirable that each of the double coated adhesive tapes 12 have so small an area. If the area of the double coated adhesive tapes 12 is so small, i.e., the double coated adhesive tapes 12 are "point-bonded," it is impossible to suitably maintain the adhesion between the plate member 610 and the electro-optical device 500. Coping with such a problem, it is desirable that the double coated adhesive tapes according to an aspect of the present invention have a predetermined area or more, thereby enabling the plate member 610 to be "area-bonded" with the electro-optical device 500. Further, it is possible to determine whether an adhesion state is the "point-bonding" state or the "area-bonding" state by considering the size of the electro-optical device. Specifically, the size of the TFT array substrate 10, the size of the counter substrate 20, and the size of the dustproof substrate 400, in particular, the size of the peripheral region or the size of the plate member 610, and the size of the unevenness 610S or the surface accuracy of the plate member 610 as a primary factor.

In various modifications, as compared with that of FIG. 9, the amount of the double coated adhesive tapes used can be depressed. Thus, cost can come down as much as the reduction in the amount of the tapes used. Further, the modifications described above can also be applied to the cover member 620.

Moreover, in the above-described exemplary embodiment, although the adhesion between the electro-optical device 500 and the plate member 610 and the adhesion between the electro-optical device 500 and the cover member 620 are made by the double coated adhesive tapes 1 and 2, the present invention is not limited to such an aspect. For example, in the inner portions of the circles shown in FIG. 7 or regions where the double coated adhesive tapes 1 and 2 are provided in FIGS. 4 and 9, it is preferable that a mold material, such as an adhesive made of silicon resin, etc., more specifically, silicon RTV rubber should be provided, instead of the double coated adhesive tapes 1 and 2.

The present invention is not limited to the aforementioned exemplary embodiments, but it can be modified without departing from the scope and spirit of the present invention. The modified electro-optical device encased in the mounting cases and projection display apparatuses also belong to the technical scope of the present invention. The electro-optical device includes an electrophoresis apparatus, an electroluminescence apparatus, a plasma display apparatus, and an apparatus using an electron-emitting device, such as a field emission display, and a surface-conduction electron-emitter display as well as a liquid crystal panel.

What is claimed is:

1. An electro-optical apparatus, comprising:
an electro-optical device, the electro-optical device including:
a first surface having an image display region on which projection light from a light source is incident and a peripheral region that surrounds the image display region, the image display region and the peripheral region of the first surface extending substantially within a same imaginary plane;
a second surface facing in an opposite direction from the first surface, the second surface including a central region and a peripheral region surrounding the central region, the central region and the peripheral region extending substantially within a same imaginary plane; and
side surfaces extending between the first and second surfaces,
a mounting case, the mounting case including:
a cover covering the side surfaces and the peripheral region of the first surface of the electro-optical device, the cover including a window that exposes therethrough the image display region of the first surface of the electro-optical device and side fin portions, the side fin portions being formed on two opposing side surfaces, respectively; and
a plate covering the peripheral region of the second surface of the electro-optical device, the plate including a window that exposes therethrough the central region of the second surface of the electro-optical device, the plate including only two bent portions, the bent portions being formed on two opposing side surfaces of the plate, respectively, each bent portion abutting against an outer surface of a side surface of the electro-optical device and an inner surface of a side surface of the cover,
a first double-coated adhesive tape interposed between the cover and the peripheral region of the first surface of the electro-optical device to bond the cover to the peripheral region of the first surface of the electro-optical device;
a second double-coated adhesive tape interposed between the plate and the peripheral region of the second surface of the electro-optical device to bond the plate to the peripheral region of the second surface of the electro-optical device; and
a molding member being between the outer surface of the electro-optical device and an inner surface of the bent portions,
plating process being performed on the surface of the at least one of the plate and the cover, the plating process being performed after performing a blast process on at least one of the surface of the plate and the surface of the cover.

2. The electro-optical apparatus according to claim 1, each of the first double coated adhesive tape and the second double coated adhesive tape including a material having the heat conductivity of 0.6 W/m·K or more.

3. The electro-optical apparatus according to claim 1, each of the first double coated adhesive tape and the second double coated adhesive tape including acryl rubber.

4. The electro-optical apparatus according to claim 1, each of the first double coated adhesive tape and the second double coated adhesive tape being provided to correspond to the whole peripheral region,
at least one of the plate and the cover being bonded to the electro-optical device over the whole peripheral region.

5. The electro-optical apparatus according to claim 1, the thickness of each of the first double coated adhesive tape and the second double coated adhesive tare being in the range of 50 to 200 μm.

6. The electro-optical apparatus according to claim 1, at least one of an outmost surface of the plate and an outmost surface of the cover being black.

7. A projection display apparatus, comprising:
the electro-optical apparatus according to claim 1;
the light source;
an optical system to guide the projection light into the electro-optical device; and
a projection optical system to project the light emitted from the electro-optical device.

* * * * *